(12) United States Patent
Hebert et al.

(10) Patent No.: US 10,142,417 B2
(45) Date of Patent: Nov. 27, 2018

(54) SYSTEM AND METHOD FOR MANAGING HETEROGENEOUS DATA FOR CLOUD COMPUTING APPLICATIONS

(71) Applicant: Nimbix, Inc., Anna, TX (US)

(72) Inventors: Stephen M. Hebert, Houston, TX (US); Leonardo E. Reiter, Allen, TX (US)

(73) Assignee: Nimbix, Inc., Anna, TX (US)

( * ) Notice: Subject to any disclaimer, the term of this patent is extended or adjusted under 35 U.S.C. 154(b) by 235 days.

(21) Appl. No.: 14/824,536

(22) Filed: Aug. 12, 2015

(65) Prior Publication Data

US 2017/0048318 A1    Feb. 16, 2017

(51) Int. Cl.
*H04L 29/08* (2006.01)
*G06F 3/06* (2006.01)
(Continued)

(52) U.S. Cl.
CPC ............ *H04L 67/1097* (2013.01); *G06F 3/06* (2013.01); *G06F 9/5072* (2013.01); *G06F 17/30091* (2013.01)

(58) Field of Classification Search
CPC ..... H04L 67/1097; G06F 3/06; G06F 9/45533
See application file for complete search history.

(56) References Cited

U.S. PATENT DOCUMENTS 5,465,354 A    11/1995  Hirosawa ................ 714/E11.195
5,579,527 A    11/1996  Chin ............................. 708/523
(Continued)

FOREIGN PATENT DOCUMENTS

EP    2 381 363 A2    10/2011    ............. G06F 9/455
EP    2 381 363 A3     3/2012    ............. G06F 9/455
(Continued)

OTHER PUBLICATIONS

Goscinski A. et al., "Toward Dynamic and Attribute Based Publication, Discovery and Selection for Cloud Computing," Future Generations Computer Systems, Elsevier Publishers, Amsterdam, NL, vol. 26, No. 7, Jul. 1, 2010, pp. 947-970.
(Continued)

*Primary Examiner* — Wing F Chan
*Assistant Examiner* — Billy H Ng
(74) *Attorney, Agent, or Firm* — Campbell Stephenson LLP

(57) ABSTRACT

A method, system, and computer-readable storage medium for managing heterogeneous data for cloud computing applications are disclosed. For example, a method involves identifying data to be used by an application. Such data includes a first subset of data stored in first storage element. The first subset of data is stored according to a first storage architecture, which organizes the first subset of data in a first form that is not compatible with the application. The method also involves generating a workflow. The generated workflow is configured to cause a compute node to retrieve the first subset of data and process the first subset of data to be organized in a second form that is compatible with the application. The workflow is also configured to cause the compute node to execute the application and update the first subset of data stored in the first storage element. The method further involves transmitting the workflow to the compute node for execution of the application therein, using the data.

22 Claims, 19 Drawing Sheets

(51) Int. Cl.
  *G06F 17/30* (2006.01)
  *G06F 9/50* (2006.01)

(56) References Cited

U.S. PATENT DOCUMENTS

| | | | |
|---|---|---|---|
| 5,781,775 A | 7/1998 | Ueno | 712/21 |
| 5,946,463 A | 8/1999 | Carr et al. | |
| 5,978,830 A | 11/1999 | Nakaya | 718/102 |
| 6,711,606 B1 | 3/2004 | Leymann et al. | |
| 7,299,466 B2 | 11/2007 | Pulsipher | 709/201 |
| 7,712,100 B2 | 5/2010 | Fellenstein et al. | |
| 7,827,273 B2 | 11/2010 | Wilson et al. | |
| 8,131,804 B2 | 3/2012 | Greata | 709/206 |
| 8,775,576 B2 | 7/2014 | Hebert et al. | |
| 8,869,164 B2 | 10/2014 | Bobroff | 718/105 |
| 9,094,404 B2 | 7/2015 | Hebert et al. | |
| 9,367,395 B1* | 6/2016 | Bono | G06F 11/1435 |
| 9,411,528 B1 | 8/2016 | McGarry et al. | G06F 3/0626 |
| 9,411,613 B1 | 8/2016 | McGarry et al. | G06F 9/44505 |
| 9,417,894 B1 | 8/2016 | Giganti et al. | G06F 9/44505 |
| 9,606,833 B2 | 3/2017 | Vrind | |
| 2003/0042930 A1 | 3/2003 | Pileggi | 326/41 |
| 2003/0154112 A1 | 8/2003 | Neiman | 705/5 |
| 2004/0210641 A1* | 10/2004 | Wu | G06F 17/30581 709/211 |
| 2006/0036743 A1 | 2/2006 | Deng | 709/227 |
| 2006/0055956 A1 | 3/2006 | Takahashi | 358/1.13 |
| 2006/0206894 A1 | 9/2006 | Jung | 718/100 |
| 2007/0083407 A1 | 4/2007 | Allen | 705/70 |
| 2007/0250365 A1 | 10/2007 | Chakrabarti et al. | |
| 2008/0066070 A1 | 3/2008 | Markov | 718/103 |
| 2008/0133741 A1 | 6/2008 | Kubota | 709/224 |
| 2008/0301685 A1 | 12/2008 | Thomas | 718/102 |
| 2009/0119746 A1 | 5/2009 | Allen | 726/1 |
| 2009/0281977 A1 | 11/2009 | Allen | 706/47 |
| 2009/0300635 A1 | 12/2009 | Ferris | |
| 2009/0319958 A1 | 12/2009 | Li et al. | |
| 2010/0042720 A1 | 2/2010 | Stienhans et al. | |
| 2010/0050172 A1 | 2/2010 | Ferris | |
| 2010/0268755 A1 | 10/2010 | Arimilli et al. | |
| 2010/0287553 A1 | 11/2010 | Schmidt | 718/101 |
| 2011/0106951 A1 | 5/2011 | Akiyama et al. | |
| 2011/0153727 A1 | 6/2011 | Li | |
| 2011/0231644 A1 | 9/2011 | Ishebabi | 713/100 |
| 2011/0276977 A1 | 11/2011 | Van Velzen et al. | |
| 2012/0005724 A1 | 1/2012 | Lee | |
| 2012/0023221 A1 | 1/2012 | Dayan | |
| 2012/0042000 A1 | 2/2012 | Heins et al. | |
| 2012/0042210 A1 | 2/2012 | Glaser et al. | |
| 2012/0047239 A1 | 2/2012 | Donahue et al. | |
| 2012/0054626 A1 | 3/2012 | Odenheimer | |
| 2012/0072597 A1 | 3/2012 | Teather et al. | |
| 2012/0131579 A1 | 5/2012 | Pujolle | 718/1 |
| 2012/0182981 A1* | 7/2012 | Kim | G06F 17/30174 370/338 |
| 2012/0198229 A1 | 8/2012 | Felke | 713/2 |
| 2012/0226843 A1 | 9/2012 | Lin | 710/264 |
| 2012/0317579 A1 | 12/2012 | Liu | |
| 2013/0097651 A1 | 4/2013 | Rendahl | 726/1 |
| 2013/0205114 A1* | 8/2013 | Badam | G06F 3/0613 711/207 |
| 2013/0219022 A1 | 8/2013 | Manivel | 709/219 |
| 2013/0318240 A1* | 11/2013 | Hebert | G06F 9/5038 709/226 |
| 2014/0040883 A1 | 2/2014 | Rompkins | 718/10 |
| 2014/0074932 A1* | 3/2014 | Mihara | H04L 67/06 709/204 |
| 2014/0181395 A1 | 6/2014 | Vincent | 711/111 |
| 2015/0081764 A1 | 3/2015 | Zhao | 709/203 |
| 2015/0096011 A1 | 4/2015 | Watt | 726/15 |
| 2015/0213011 A1* | 7/2015 | George | G06F 17/303 707/802 |
| 2015/0261216 A1 | 9/2015 | Yasuma | 700/100 |
| 2015/0261517 A1 | 9/2015 | Hodge | 717/176 |
| 2015/0269383 A1 | 9/2015 | Lang | 726/1 |
| 2015/0293793 A1 | 10/2015 | Vrind | 718/103 |
| 2016/0188877 A1 | 6/2016 | Simha | 726/22 |
| 2016/0299795 A1 | 10/2016 | Kagami | |
| 2016/0314025 A1 | 10/2016 | McGarry et al. | G06F 9/542 |

FOREIGN PATENT DOCUMENTS

| | | | | |
|---|---|---|---|---|
| EP | | 3007061 A1 * | 4/2016 | G06F 9/445 |
| WO | WO 2013/097902 | | 7/2013 | H04W 8/26 |

OTHER PUBLICATIONS

Lazouski, A., et al., "Usage Control in Cloud Systems," Internet Technology and Secured Transactions, 2012 International Conference for Internet Technology and Secured Transactions, IEEE, Dec. 10, 2012, pp. 202-207.

Hsiliev's Blog, "Running Existing Applications on SAP HANA Cloud," retrieved from the Internet: URL: http://hsiliev.blogspot.nl/2013/06/running-existing-applications-on-sap.html (retrieved Apr. 16, 2015); Jun. 30, 2013, pp. 1-8.

Baxter, Rob. et al., "Maxwell—a 64 FPGA Supercomputer", Second NASA/ESA Conference on Adaptive Hardware and Systems (AHS), 2007, IEEE, 8 pages.

Chung, Eric S. et al., "CoRAM: An In-Fabric Memory Architecture for FPGA-based Computing", Carnegie Mellon University, 2011, 10 pages.

Convey Computer Corporation, "The Convey HC-2 TM Computer—Architectural Overview," Convey White Paper, 2011-2012, 10 pages.

George, Alan et al., "Novo-G: At the Forefront of Scalable Reconfigurable Supercomputing", Jan./Feb. 2011 issue of IEEE Magazine—Computing in Science and Engineering, 4 pages.

Putnam, Andrew et al., "A Reconfigurable Fabric for Accelerating Large-Scale Datacenter Services", Catapult ISCA 2014, Microsoft, IEEE 2014, 12 pgs.

Sato, Yukinori et al., "Evaluating Reconfigurable Dataflow Computing Using the Himeno Benchmark", IEEE 2012, 7 pages.

So, Hayden Kwok-Hay et al., "A Unified Hardware/Software Runtime Environment for FPGA-Based Reconfigurable Computers Using BORPH", Department of Electrical Engineering and Computer Science—University of California, Berkeley, Oct. 22-25, 2006; pp. 259-264.

* cited by examiner

SYSTEM AND METHOD FOR MANAGING HETEROGENEOUS DATA FOR CLOUD COMPUTING APPLICATIONS

CROSS-REFERENCE TO RELATED APPLICATIONS

The present application is related to U.S. patent application Ser. No. 14/809,644, filed on Jul. 27, 2015, entitled "Reconfigurable Cloud Computing," which is a continuation of and is related to U.S. patent application Ser. No. 14/282,407, filed on May 20, 2014, entitled "Reconfigurable Cloud Computing," now U.S. Pat. No. 9,094,404, which issued on Jul. 28, 2015, which is a continuation of and is related to U.S. patent application Ser. No. 13/449,003, filed on Apr. 17, 2012, entitled "Reconfigurable Cloud Computing," now U.S. Pat. No. 8,775,576, which issued on Jul. 8, 2014. This application is also related to U.S. patent application Ser. No. 14/541,877, filed on Nov. 14, 2014, entitled "Dynamic Creation and Execution of Containerized Applications in Cloud Computing," which in turn claims the domestic benefit under Title 35 of the United States Code § 119(e) of U.S. Provisional Patent Application No. 61/905,259, entitled "Dynamic Creation and Execution of Containerized Applications in Cloud Computing," filed Nov. 17, 2013. The provisional and four non-provisional applications referenced above are hereby incorporated by reference in its entirety and for all purposes as if completely and fully set forth herein.

FIELD OF THE INVENTION

This invention relates to cloud computing applications, and more particularly, to managing heterogeneous data for cloud computing applications.

DESCRIPTION OF THE RELATED ART

A high-performance computing (HPC) system can be used to execute applications that require computationally-extensive operations. In order to execute such applications, data to be used by the application must be identified and retrieved prior to executing the application. Likewise, when the execution of the application is complete, the data that was used or processed by the application must be stored in an updated form or as an updated version. Given that data can come from a number of different storage elements, the process by which application data is accessed and updated may present difficulties.

BRIEF DESCRIPTION OF THE DRAWINGS

The embodiments of the present application may be better understood, and its numerous objects, features, and advantages made apparent to those skilled in the art by referencing the accompanying drawings.

Figure 1:
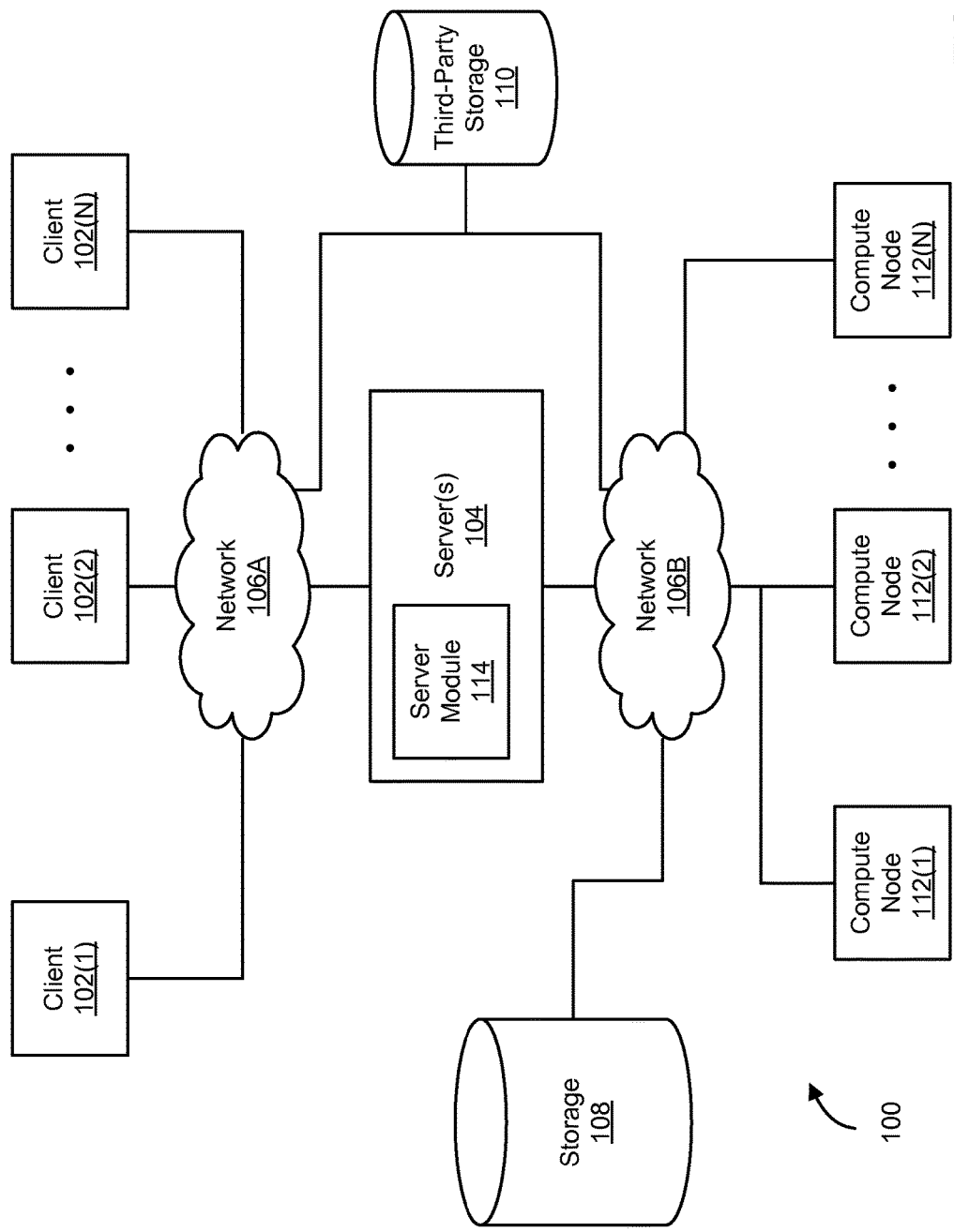
FIG. 1 is a block diagram illustrating a distributed computing system, according to one or more embodiments.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention is described below in connection with several embodiments, the invention is not intended to be limited to the specific forms set forth herein. On the contrary, it is intended to cover such alternatives, modifications, and equivalents as can be reasonably included within the scope of the invention as defined by the appended claims.

Distributed computing systems (such as distributed High Performance Computing (HPC) systems) are computing systems used to execute applications that require processing, managing, and/or storing large amounts of data (which can be computationally extensive). Some examples of computationally-extensive applications are applications used for oil & gas analysis, manufacturing/engineering simulations, data analytics, scientific data analysis, and so on.

Typically, a distributed HPC system is comprised of several high-performance resources that may be distributed among multiple compute nodes or servers, which are connected to each other using a network. These computing resources, and the performance thereof, can be combined, as needed, to enable clients to execute such computationally-extensive applications over a network. Thus, distributed HPC systems are referred to as cloud-based computing systems. A cloud-based computing system allows user data to be stored in cloud storage and further allows applications (e.g., also referred to as cloud computing applications) to be executed via a remote server using such data.

FIG. 1 is a block diagram illustrating a distributed computing system 100 (e.g., a cloud-based computing system) that includes a collection of clients, server(s), and storage. Distributed computing system 100 includes several clients, server(s), and storage, e.g., client(s) 102(1)-102(N), server(s) 104, storage 108, third-party storage 110, and one or more compute nodes 112(1)-112(N). Storage 108 and third-party storage 110 may represent data (or subsets of data) stored in cloud storage. Each of clients 102, server(s) 104, storage 108, and third-party storage 110 can communicate with each other using one or more networks, e.g., network 106A and 106B. Each of network 106A and 106B can include the Internet, a local area network (LAN), a wide area network (WAN), a storage area network (SAN), and/or any combination thereof.

It is noted that distributed computing system 100 may include a different number of elements. For example, in one embodiment, distributed computing system 100 may comprise server(s) 104 (which include server module 114), network 106(B), storage 108, and compute node(s) 112.

Each client, e.g., client(s) 102(1)-102(N), can be implemented as a computing entity, including but not limited to, a computer, a phone (e.g. a smart phone), a tablet, a virtual machine, among others. Each client accesses a server, e.g., server(s) 104, such as by issuing a request to execute an application. Each client also accesses, such as by using network 106A, user data that is stored using third-party storage 110. Each client also stores, using network 106A, user data at third-party storage 110. Each client provides one or more parameters to the server. These parameters can include information regarding the location and/or type of data, the operation(s) to be performed on the identified data, the type and name of application(s) to be executed, among other information.

In one implementation, the client accesses the network, e.g., the Internet, using an Internet browser to submit a request (which can be referred to as a command) The server(s), e.g., server(s) 104, access the request data (including the provided parameters), control the performance of the specified operation(s) by one or more compute nodes, and return the results to the client(s). In essence, server(s) 104 provide HPC services to client(s) 102(1)-(N), using compute nodes 112(1)-(N), over network(s) 106A and 106B, and such functionality can be referred to as using a cloud, since the user data, the applications that operate on that data, the computing nodes that execute such applications, and/or the server(s) that control such operations are distributed over one or more networks.

Server(s) 104 include a server module (e.g., a server module 114). Server module 114 receives a request from client(s) 102(1)-102(N) via network 106A. Server module 114 selects an application based on this request. For example, the request can include parameters that indicate operation(s) to be performed on data, and thus server module 114 selects an application that can perform such operation(s). Server module 114 selects computing resources for the application. Server module 114 then communicates over network 106B with compute nodes 112(1)-112(N) to send communications (e.g., jobs) to execute the application using the selected computing resources with one or more compute nodes 112. Server module 114 receives the execution results of the application from the compute node(s) and returns such results to the client that initiated the request. Server module 114 also accesses various models, templates or layers, and data in storage 108 during operation.

Each compute node 112(1)-112(2) may include one or more computing resources. A compute node, e.g., compute node 112(1), receives communication, over network 106B, (e.g., based on a workflow) from server module 114 to execute an application using one or more computing resources. The application accesses the data from third-party storage 110 during such execution, as specified by the parameters. The compute node(s) also return results of the application execution to server module 114.

Each client, e.g., clients 102(1)-102(N), accesses third-party storage, e.g., third-party storage 110, via network 106A. Third-party storage 110 may include one or more distributed storage devices and/or external cloud storage, among others. Third-party storage 110 stores data, such as data that is stored by the client(s). The stored data can be operated on by the application. In one implementation, third-party storage 110 can be implemented by a cloud storage element, allowing client(s) to upload and store their data separately from the client(s).

The network, e.g., network 106A and/or 106B, can include the Internet and/or other network(s), such as LAN, WAN, and/or SAN. The network is configured to allow communication between the client(s), server(s), and/or storage. In one implementation, the client(s) access other elements of the distributed computing system using a first type of network (e.g., WAN), whereas the server(s) accesses other elements of the distributed computing system using a second type of a network (e.g., LAN).

Figure 2:
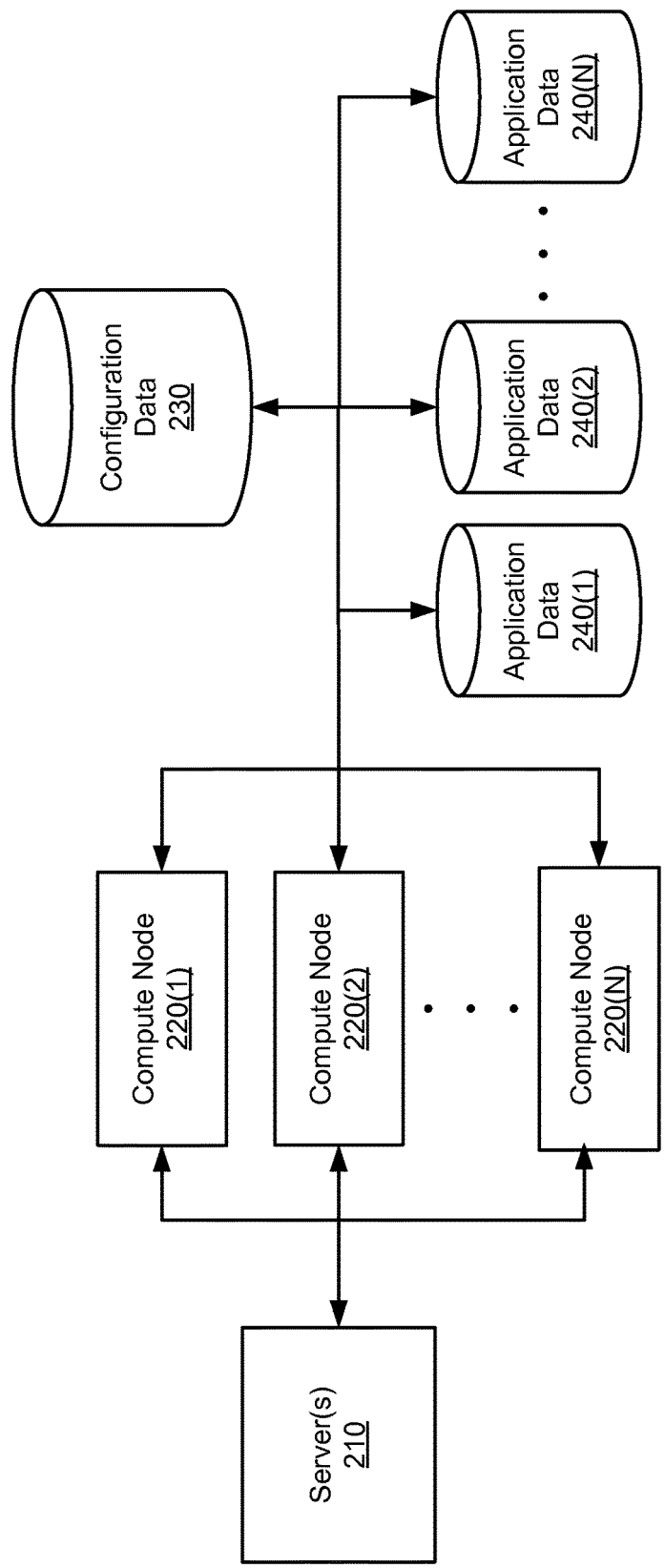
FIG. 2 is a block diagram illustrating a distributed computing system, according to one or more embodiments.

FIG. 2 illustrates another example of a distributed computing system, according to one or more embodiments. Server(s) 210 (which may include one or more sub-modules) receive incoming command(s) from clients, such as clients 102(1)-102(N) of FIG. 1. Upon receipt of a command, server(s) 210 analyze the command to obtain various parameters that are needed to execute the command. For example, a command may be analyzed to identify one or more applications to be executed for the client, configuration parameters to be used for the application(s), the number and types of operations to be performed, and the user data (e.g., referred to as application data) to be referenced and/or processed by the application(s).

One or more compute nodes to be used for executing the command are identified by server(s) 210. This involves identifying the number of compute nodes to be used and the type and number of applications to be executed at each compute node. As an example, a command may require the use of one or more compute nodes and/or the execution of one or more applications within each compute node. The selection of compute nodes to be used for executing a command may be based on the performance parameters of each compute node (and the number and type of resources contained therein).

Compute nodes to be used for a command may be selected from an N number of compute nodes, illustrated as compute nodes 220(1)-(N). Compute nodes 220(1)-220(N) are hereinafter collectively referred to as compute nodes 220. Compute nodes 220 include one or more resources (e.g., hardware components, such as processors, field programmable gate arrays (FPGAs), graphics processing units (GPUs), floating point units (FPUs), digital signal processors (DSPs), central processing units (CPUs), and other general and specialized processors, as well as other hardware and software resources) that are usable for configuring and executing applications.

Instructions related to the execution of a command are generated by server(s) 210. Such instructions are referred to as a workflow. Whenever a compute node receives a workflow, the applicable instructions are executed by the compute node. For example, a compute node receiving a workflow may execute instructions related to the configuration of an application by retrieving the necessary configuration data from configuration data 230. Configuration data 230 includes one or more databases of information regarding the configuration of application(s), such as application images for use in configuring an application.

In some embodiments, a workflow may indicate the use of containers for executing applications at a compute node. A container represents isolated computational space supported by one or more compute nodes, which can be customized for the execution of one or more application(s). In particular, a container is configured to provide an environment (e.g., including an operating system) that allows for the execution of an application.

If containers are to be used, a workflow may indicate the number of containers to be launched within each compute node, the types of environments to be used for each container, as well as the number and type of application(s) to be executed within each container, as determined by server(s) 210. The compute node will implement instructions within a workflow related to configuring containers. A desired environment for a container is implemented by a compute node using a corresponding environment template (which has been pre-configured and stored as part of configuration data 230) or by creating a new environment template. An environment template is a representation of the environment, including configuration files and parameters (e.g., for an operating system, drivers, and so on).

Thereafter, an application is configured and executed within the container using a corresponding application image (e.g., a representation of the application, including the necessary configuration files and parameters) that may also be stored as part of configuration data 230. In some embodiments, the combination of an environment template and application image (to be used together within a container) may be saved and retrieved as a container template from configuration data 230. A container template is a combined representation of the environment and application configuration files and parameters.

Configuration data 230 may also include information related to enabling network communications between the different components of FIG. 2, the transmission of workflows from server(s) 210 to compute nodes 220, and the transmission of results from compute nodes 220 to server(s) 210.

A workflow generated by server(s) 210 also includes instructions related to identifying application data and pre-processing the application data (if needed), prior to executing an application. Data to be used by an application (which is referred to as application data) is identified by server(s) 210. Alternatively, server(s) 210 can identify a set of storage elements that may store the application data.

Application data can include different subsets of data, where each subset of data is stored in a different storage element. For example, application data can represent a set of files stored in a first storage element, one or more objects stored in a second storage element, and/or a set of blocks stored in a third storage element. As shown, application data is stored within an N number of storage elements, illustrated as application data 240(1)-240(N), which are herein after collectively referred to as application data 240.

Each individual storage element can also be referred to as a storage vault. A storage element may represent any type of storage where users can store persistent data, including file systems, block-level storage devices, block-level cloud storage, and so on. Storage elements may be assigned per user and accessible from a management network. When submitting a command, a client user may also select the application data (such as specific files and directories) to operate on.

Instructions related to pre-processing application data are executed by a compute node to ensure that the different subsets of application data within each storage element is compatible with an application. A storage element may use any of a number of different storage architecture types. A storage architecture type refers to the type of organizational method used by the storage element to store data within the storage element. Some examples of storage architecture types include file-level, block-level, or object-level storage types that store/organize data into files, block, and objects, respectively. A storage architecture type indicates how data can be retrieved from a storage element. For example, if a storage element organizes data into blocks, such data can be retrieved from the storage element using block-level information. Similar approaches are taken for data stored in other storage elements that store data according to other storage architecture types. Given that application data can reside in different storage elements, which utilize different architecture types, the different subsets of application data can be referred to as heterogeneous data for an application.

An application may only be able to operate on data that is organized in one particular type (e.g., as files). The storage type relied upon by an application may not be compatible or the same as the storage type that is used by a storage element to be accessed. For example, an application may only know how to operate on files, while a storage element to be accessed by the application may only organize data into blocks. In such scenarios, the application will be unable to use data from the storage element, given that the application will lack the necessary block-to-file mapping information (and generating such information will require changes to the application, which is not ideal).

One or more data abstractions should be performed on subsets of application data that are not compatible with an application. Instructions related to pre-processing application data may be included as part of the workflow generated by server(s) 210, to address and resolve the incompatibility issues. This is because the workflow instructs a compute node to perform data abstractions, as needed, to change or modify any application data that is not compatible with an application into a form that is compatible with the application. Thus, the application does not need to be modified, given that a workflow calls for pre-processing application data, prior to executing the application.

As used herein, data abstractions are processes performed by a compute node (or a storage element under the direction of a compute node) to convert or change data from one storage organizational type to another that is compatible with an application. Some examples of data abstractions include creating file-level information from block-level information, creating file-level information from storage-level information, decrypting data, and so on. In other embodiments, data abstractions may also involve creating a data-share environment, where data from a storage element is abstracted to look like a file system that can be shared with multiple compute nodes.

Any data abstractions performed as part of executing a workflow are performed in an automatic and seamless manner (e.g., transparent to the application), regardless of the number and types of storage elements involved. The execution of the instructions (as performed by a compute node) may vary for each compute node and application combination (depending on the number and type of data abstractions to be performed), but the workflow and accompanying instructions to pre-process application data (which are generated by a server) will be the same regardless of the type of application being executed or the type of storage elements involved.

Workflow instructions may indicate that an application can be executed once application data has been pre-processed. In addition, workflow instructions may also indicate that application data processed/modified during execution should be updated accordingly (e.g., to reflect such changes in the original storage element). This process is referred to as post-processing application data. Post-processing application may require that a compute node perform additional data abstractions (e.g., which may be the exact opposite of those performed to pre-process such application data) to return the updated application data to the original storage organizational type. The additional data abstractions may also include removing any previously formed data-share environments.

Instructions in a workflow may also indicate that a container (if being used) is to be de-provisioned once the application has completed execution and the application data has been updated and presented to server(s) 210.

Figure 3A:
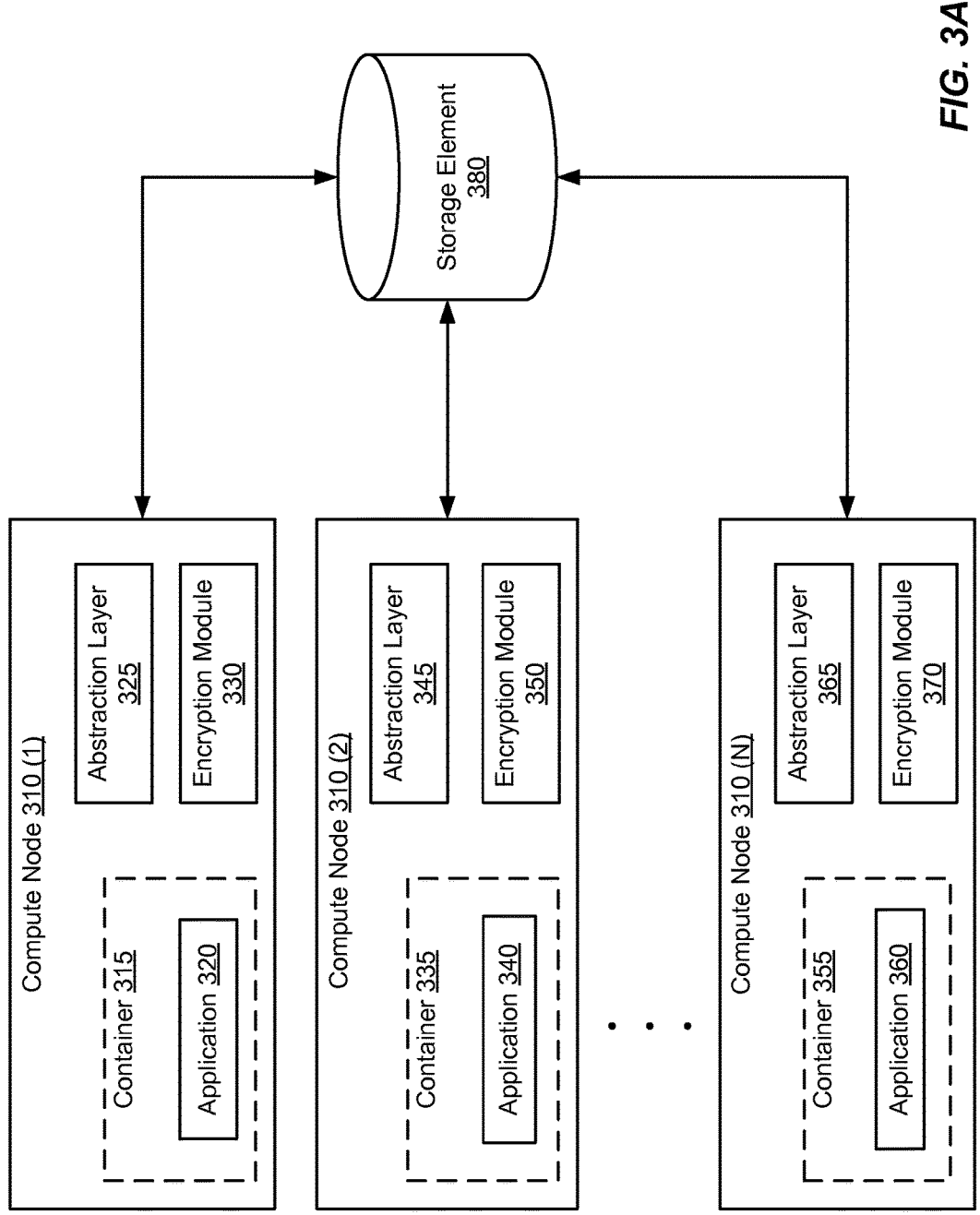
FIG. 3A is a block diagram illustrating compute nodes connected to a storage element, according to one or more embodiments.

FIG. 3A illustrates computing nodes coupled to a storage element. The storage element of FIG. 3A supports multiple connections to multiple compute nodes. As shown, storage element 380 is coupled to multiple compute nodes. Such a configuration can be used, for example, in cases where data within a storage element is to be shared by multiple compute nodes simultaneously and the storage element supports multiple connection paths.

The compute nodes of FIG. 3A are illustrated as an N number of compute nodes (e.g., compute nodes 310(1)-310(N)), which are hereinafter collectively referred to as compute nodes 310. Each compute node 310 can include one or more containers and one or more applications. In some embodiments, the inclusion of containers within a compute node 310 is optional.

As shown, compute node 310(1) includes a container 315 and an application 320. Container 315 has been illustrated using a dashed line to indicate that container 320 is optional. Application 320 can represent any application to be executed within compute node 310(1), such as a computationally-extensive application. In addition, application 320 is executed within container 315, if container 315 is used. If container 315 is used, container 315 represents a dedicated space with a customized environment for executing application 320.

Compute node 310(1) also includes an abstraction layer 325. Abstraction layer 325 performs data abstractions, as needed, to enable application data from storage element 380 to be in a form that is usable by application 320. Data abstractions performed by abstraction layer 325 may include, for example, creating new/additional mapping information or re-mapping data within storage element 380. In some embodiments, abstraction layer 325 resides between other layers of compute node 310(1) (e.g., between a database layer and a web server layer (not shown)), and thus, application 320 may access data from storage element 380 via abstraction layer 325.

An encryption module 330 is also part of compute node 310(1). Encryption module 330 is a module for encrypting and decrypting application data retrieved from and returned to storage element 380. As an example, encryption module 330 can retrieve application data (such as an encrypted file) that is called upon by application 320 and decrypt the application data prior to presenting the decrypted application data to application 320. Such decryption can be performed, for example, using encryption information (e.g., an encryption key) maintained or received by compute node 310(1). Thus, encryption module 330 can perform encryption "on the fly" which decrypts data from storage element 380 only when such data is needed. Such an approach protects the remaining data within storage element 380 from being accessed.

Encryption module 330 can also return updated application data (e.g., an updated version of a file or a set of changes to be applied to the file) to storage element 380 in an encrypted form. For example, encryption module 330 can encrypt updated application data (e.g., by applying the same encryption algorithm used by storage element 380) and then transmit the encrypted updated application data to storage element 380. The encrypted updated data can then be stored in storage element 380.

Decryption and encryption processes performed by encryption module 330 can be performed on an as needed basis. This approach performs decryption and encryption processes as needed on specific sections of data from storage element 380. Alternatively, if desired, or if such functionality improves overall performance, encryption module 330 can also decrypt application data as a whole (e.g., decrypting all data in storage element 380) prior to executing application 320 and store the results thereof in a temporary location. Similarly, encryption module 330 can encrypt data as a whole from the temporary location and return the updated application data, in the encrypted form, to storage element 380, after the application has completed execution.

As shown, abstraction layer 325 and encryption module 330 are separate from each other. In some embodiments, however, the functionality of encryption module 330 can be performed by abstraction layer 325 (e.g., such that encryption module 330 is part of abstraction layer 325).

Although not shown, compute node 310(1) can be configured to execute more than one application. These additional applications can be configured to execute within container 315 or within other containers that are configured within compute node 310(1). Additionally, the functionality of abstraction layer 325 and encryption module 330 may be separate from compute node 310(1) and/or as part of storage element 380.

Computing node 310(2) is illustrated as including similar components to those in computing node 310(1). As shown, computing node 310(2) includes an optional container 335, an application 340, an abstraction layer 345, and an encryption module 350. Computing node 310(N) includes an optional container 355, an application 360, an abstraction layer 365, and an encryption module 370. The components within computing node 310(2) and 310(N) operate in a similar manner than the comparable components in computing node 310(1). Also, in some embodiments, one or more compute nodes may utilize containers to execute application(s), while other compute nodes may not use container(s) to execute application(s).

Storage element 380 represents a database of application data. Storage element 380 is configured to be shared among multiple compute nodes, such as compute nodes 310. Thus, application data within storage element 380 can be accessed by more than one compute node at a time. Given the capability of storage element 380, storage element 380 can be successfully connected and mounted on each of compute nodes 310.

Figure 3B:
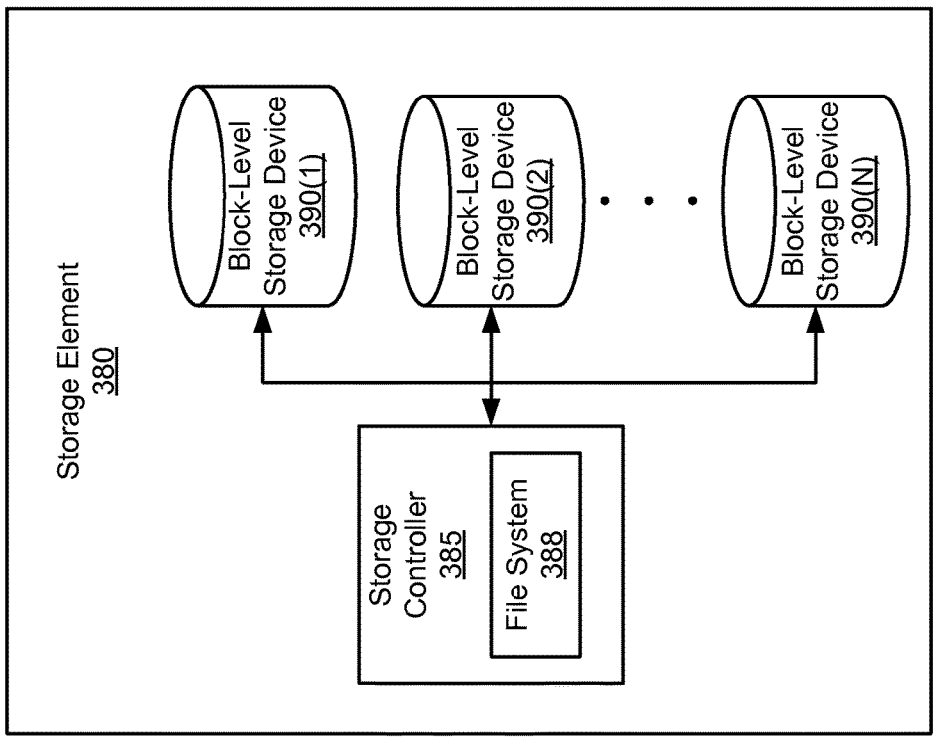
FIG. 3B is a block diagram illustrating exemplary components of a storage element, according to one or more embodiments.

FIG. 3B illustrates exemplary components of a storage element. Storage element 380, which corresponds to storage element 380 of FIG. 3A, is illustrated in detail to show example components within. Storage element 380 represents a file-level storage element that can be connected and mounted on various compute nodes. A file-level storage element is an element that stores/organizes data into files. As such, data from storage element 380 can be called upon using a corresponding file name. Some examples of a file-level storage element include network-attached storage (NAS), such as a network file system (NFS), a common-internet file system (CIFS), or the like.

Storage element 380, as shown, includes a storage controller 385, which further includes a file system 388. Storage controller 385 controls storage within one or more block-level storage devices. Storage element 380 includes an N number of block-level storage devices, which are illustrated as block-level storage devices 390(1)-390(N). Block-level storage devices 390(1)-390(N) are hereinafter collectively referred to as block-level storage devices 390.

Each block-level storage device 390 represents a storage device that stores/organizes data into blocks. Such blocks can be assigned a logical unit number, for example, which can then be used to call upon blocks of data in a block-level storage device 390. Blocks from a block-level storage device 390 can be combined, in a particular order, to create a file. Such a process of combining and mapping blocks of storage into files is performed by storage controller 385. Such information is used by storage controller 385 to create a set of files. This set of files is represented and maintained as file system 388. Any data to be accessed from storage element 380 can thus be called upon by a file name, which is typically a storage organization type that is usable by an application.

Figure 4A:
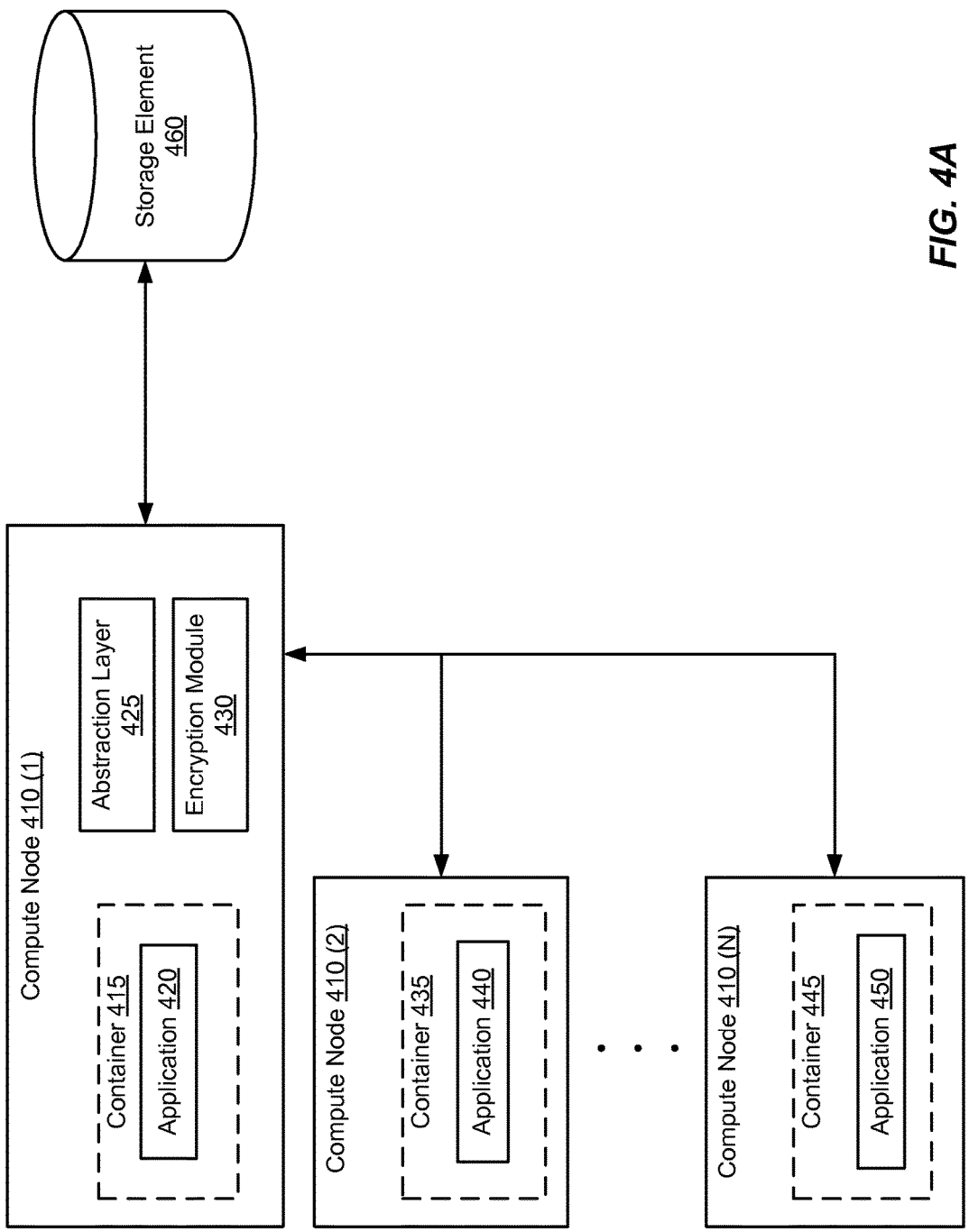
FIG. 4A is a block diagram illustrating another embodiment of compute nodes connected to a storage element, according to one or more embodiments.

FIG. 4A illustrates a system of compute nodes connected to a storage element. A storage element, such as storage element 460 of FIG. 4A, is a storage element that can only be connected/mounted to a single compute node via a single connection path. As shown, storage element 460 is connected and mounted to compute node 410(1), which is referred to as the master compute node.

Data within storage element 460 may, however, need to be shared with other compute nodes, which include compute nodes 410(2)-(N), during the execution of a job. For example, a job or workflow may indicate that data within storage element 460 may need to be shared with other compute nodes, when applications at those respective compute nodes are executed. In order to share the data within storage element 460, compute node 410(1) performs data abstractions to enable such data to be exported (and thus shared) with other compute nodes (e.g., compute nodes 410(2)-(N), which are referred to as slave compute nodes. Such exporting can be performed, for example, via a management or Infiniband network to the slave compute nodes for network-attached storage type mounting.

As shown, compute node 410(1) includes an optional container 415 and application 420. Application 420 may be executed within container 415, if such a container is to be used. Compute node 410(1) also includes an abstraction layer 425 and an encryption module 430.

Abstraction layer 425 performs data abstractions, as needed, to enable data within storage element 460 to be usable by application 420 and shareable with compute nodes 410(2)-(N). Thus, if data within storage element 460 is not organized in a manner that is usable by application 420, abstraction layer 425 performs the data abstractions needed to convert or modify such data to be organized in a manner that is usable by application 420. In addition, abstraction layer 425 also configures compute node 410(1) as a master compute node and exports the data from storage element 460, in the converted or modified form, to the remaining compute nodes (e.g., the slave compute nodes) via a management or Infiniband network. In some embodiments, abstraction layer 425 resides between other layers of compute node 410(1) (e.g., between a database layer and a web server layer (not shown)), and thus, application 420 may access data from storage element 460 via abstraction layer 425.

Encryption module 430 serves to encrypt and decrypt data that is retrieved from and returned to storage element 460, as needed. The decryption processed may be performed in response to data being needed by any of applications 420, 440, and 450. Similarly, encryption module 430 also performs encryption processes needed to encrypt data being returned from any of applications 420, 440, or 450 to storage element 460.

As shown, abstraction layer 425 and encryption module 430 are separate from each other. In some embodiments, however, the functionality of encryption module 430 can be performed by abstraction layer 425 (e.g., such that encryption module 430 is part of abstraction layer 425).

The remaining compute nodes (e.g., 410(2)-(N)), which are referred to as slave compute nodes, are shown to include optional containers, illustrated as containers 435 and 445, and applications, which are illustrated as applications 440 and 450, respectively. Given that slave compute nodes are not coupled directly to storage element 460, slave compute nodes are not designed or configured to include abstraction layers or encryption modules within.

Figure 4B:
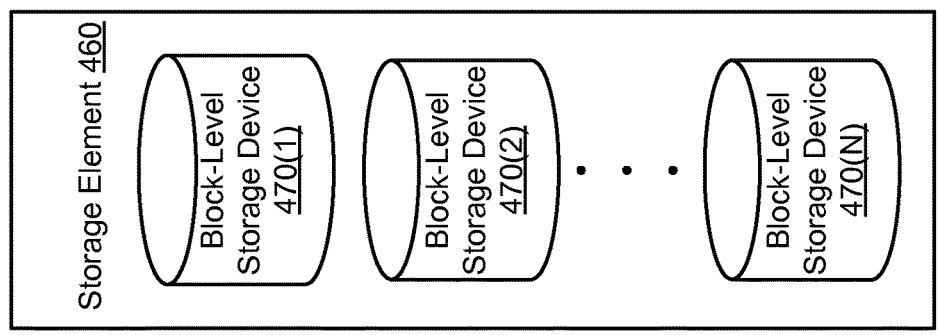
FIG. 4B is a block diagram illustrating other exemplary components of a storage element, according to one or more embodiments.

Storage element 460 represents a storage element with a single-path of connection. Thus, storage element 460 can only be connected/mounted on a single compute node. FIG. 4B illustrates exemplary components of a storage element, such as storage element 460 of FIG. 4A.

As shown, storage element 460 includes an N number of block-level storage devices, illustrated as block-level storage devices 470(1)-(N), which are hereinafter collectively referred to as block-level storage devices 470. Data within block-level storage devices 470 is organized into blocks and is called upon using block numbers or logical unit numbers that represent such blocks. Some examples of block-level storage devices include network-attached disk arrays and the like.

Figure 5A:
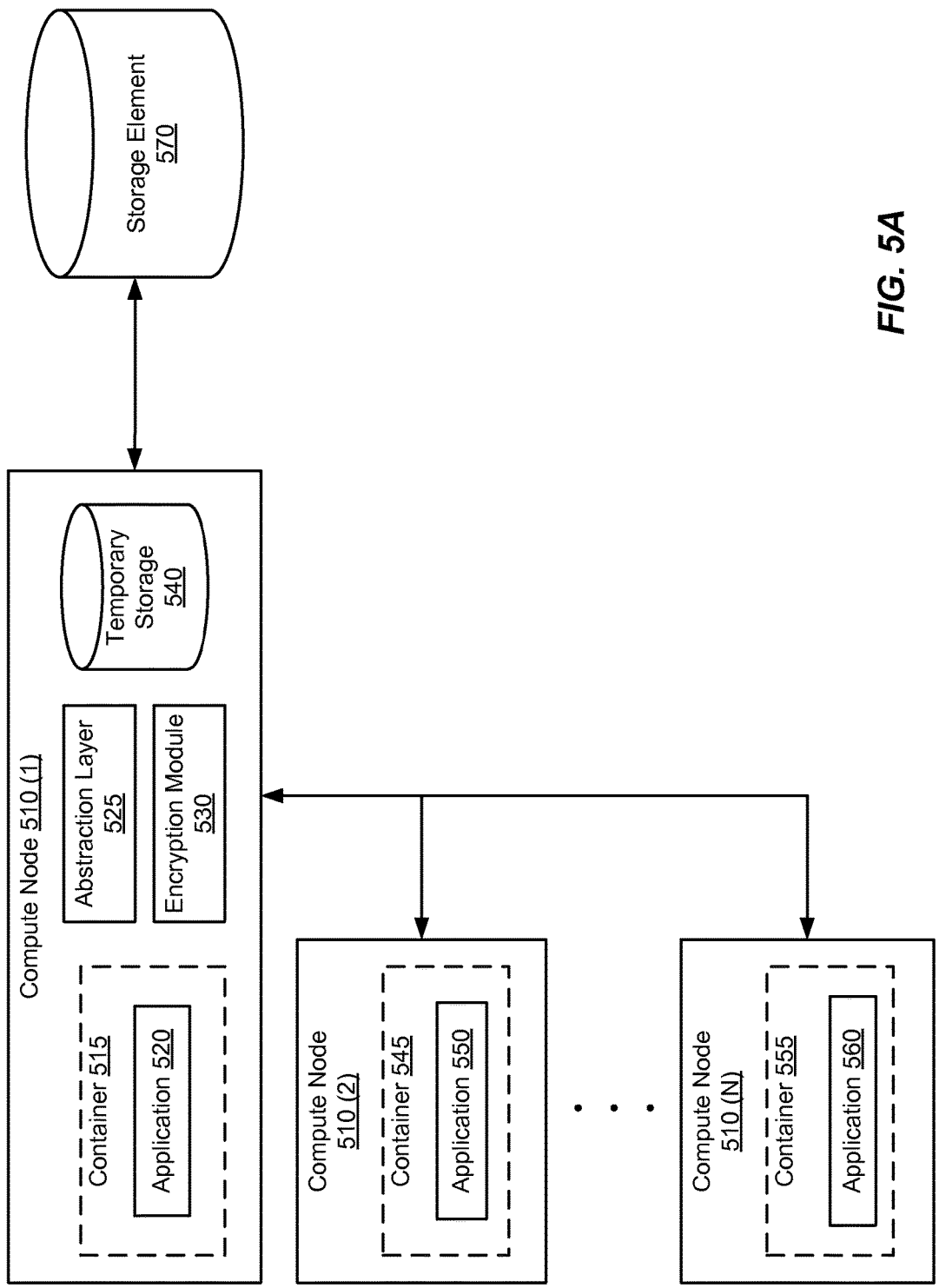
FIG. 5A is a block diagram illustrating yet another embodiment of compute nodes connected to a storage element, according to one or more embodiments.

FIG. 5A illustrates a system of compute nodes connected to a storage element. Storage element 570 is a storage element that is not mountable on a compute node. In such scenarios, the contents, or at least a portion of the contents, of storage element 570 are copied and stored within temporary storage 540. Temporary storage 540 can then be mounted on a master compute node, such as compute node 510(1), and exported or shared with slave compute nodes, such as compute nodes 510(2)-(N).

As shown, compute node 510(1) is the master compute node that is connected to storage element 570. Compute node 510(1) includes an optional container 515 for executing application 520. Compute node 510(1) also includes an abstraction layer 525, an encryption module 530, and temporary storage 540. Abstraction layer 525 initiates the copying of data from storage element 570 to temporary storage 540. In addition, abstraction layer 525 performs any further data abstractions needed to enable such data to be usable by application 520, which can include the conversion of data from one organizational type to another. Encryption module 540 decrypts/encrypts data in temporary storage 540. Data copied from storage element 570, if encrypted, is decrypted as a whole, and stored in a decrypted form as part of temporary storage 540.

Abstraction layer 525 also configures the sharing of data in temporary storage 540 to slave compute nodes, which are illustrated as compute nodes 510(2)-(N). This can be performed, for example, by creating a file system from data in temporary storage 540. Afterwards, such file-system like data can be exported to slave compute nodes 510(2)-(N) via a management or Infiniband network, for example. Each of compute nodes 510(2)-(N) includes an optional container, illustrated as containers 545 and 555, respectively, and applications to be executed at each compute node, which are illustrated as applications 550 and 560, respectively. In some embodiments, abstraction layer 525 resides between other layers of compute node 510(1) (e.g., between a database layer and a web server layer (not shown)), and thus, application 520 may access data from storage element 570 via abstraction layer 525.

As shown, abstraction layer 525 and encryption module 530 are separate from each other. In some embodiments, however, the functionality of encryption module 530 can be performed by abstraction layer 525 (e.g., such that encryption module 530 is part of abstraction layer 525).

Figure 5B:
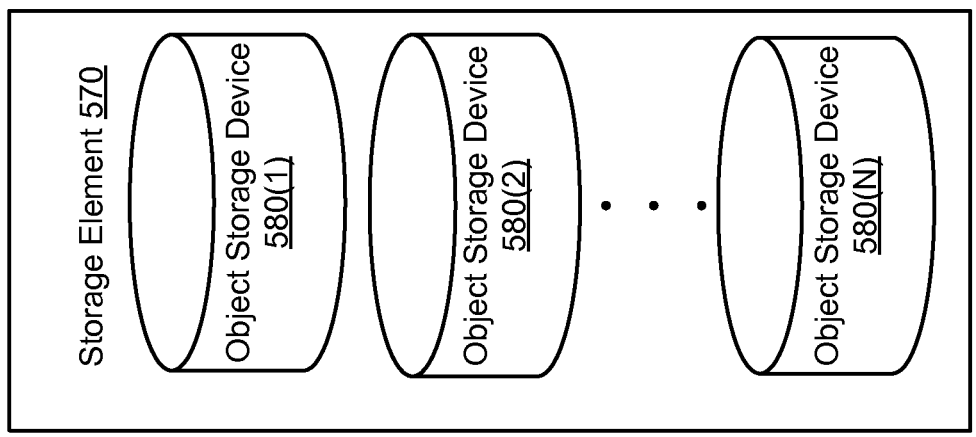
FIG. 5B is a block diagram illustrating other exemplary components of a storage element, according to one or more embodiments.

Storage element 570 represents a storage element that is not mountable. This means that the contents of storage element 570 cannot be accessed in real-time and/or as a network file system. As such, storage element 570 can be connected to a compute node, but the contents of the storage element cannot be mounted (e.g., accessed as files) by the compute node. FIG. 5B illustrates exemplary components of a non-mountable storage element, such as storage element 570 of FIG. 5A. As shown, storage element 570 includes an N number of object storage devices, illustrated as object storage devices 580(1)-580(N), which are hereinafter collectively referred to as object storages 580.

Each object storage device 580 represents a storage device that stores data as objects. Some examples of object storage devices include transient cloud storage devices that are accessed via a cloud platform. Objects within object storage devices 580 can only be accessed and/or updated as entire objects. Thus, if an object is retrieved and modified, the entire modified object must be used to replace the original object. This is contrary to file and block-level storage elements which allow for tracking and applying changes to an existing file or block, without having to replace or change the original file or block. When dealing with object storage devices, objects are typically copied to a temporary working location and abstracted as such, in order to enable such data to be accessed by a master compute node, as well as other compute nodes.

Figure 6:
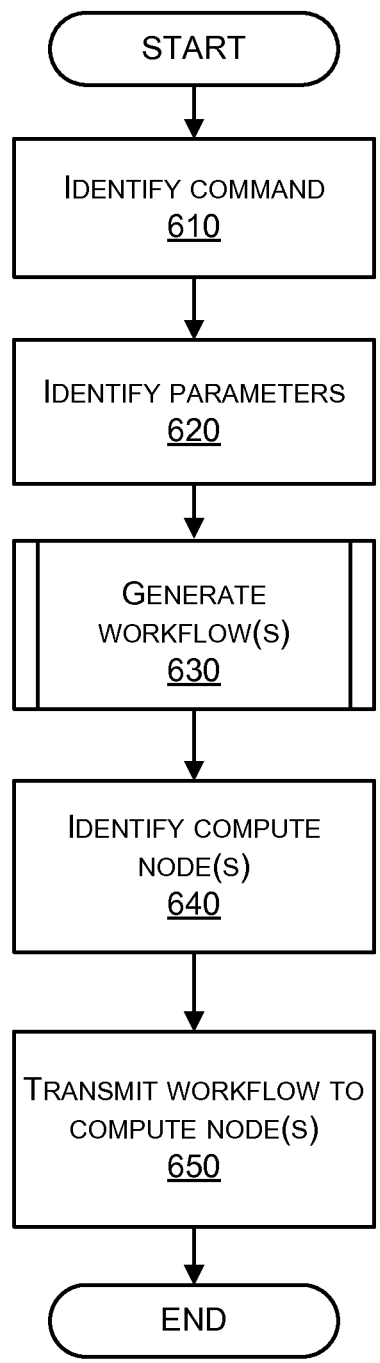
FIG. 6 is a flowchart illustrating a method for using a distributed computing system, according to one or more embodiments.

FIG. 6 illustrates a flowchart illustrating an overall process for using a distributed computing environment. The process of FIG. 6 can be performed, for example, by a server, such as server 104 of FIG. 1. The process begins at 610 where a command is identified. A command can be received from a client, such as one of clients 102 of FIG. 1, as part of requesting the execution of an application. Information within the command can be used to identify parameters related to such a command at 620. Such parameters include, for example, the identification of one or more applications to be executed, the identification of one or more operations to be performed, the identification of configuration parameters for each application, and the location and type of application data to be used by each application.

Once such parameters have been identified, the process continues to 630. At 630, a workflow is generated. Details regarding the workflow content and/or instructions therein can be seen with regards to FIG. 7. Once the workflow has been generated, the process continues to 640, where one or more compute nodes are identified. Such compute nodes are identified as the recipients of the workflow for configuring and executing the identified applications. One or more compute nodes may be selected by retrieving and analyzing information related to the resources and capabilities of each compute node as compared to the requirements of the applications to be executed.

Once the compute nodes have been identified, the process continues to 650, where the generated workflow is transmitted to the identified compute nodes. At this point, the process of FIG. 6 ends. The process of FIG. 6 may involve the execution of multiple applications at multiple compute nodes. Thus, the process of FIG. 6 may involve the generation of various workflows, the identification of various compute nodes, and the transmission of a corresponding workflow to each corresponding compute node.

Figure 7:
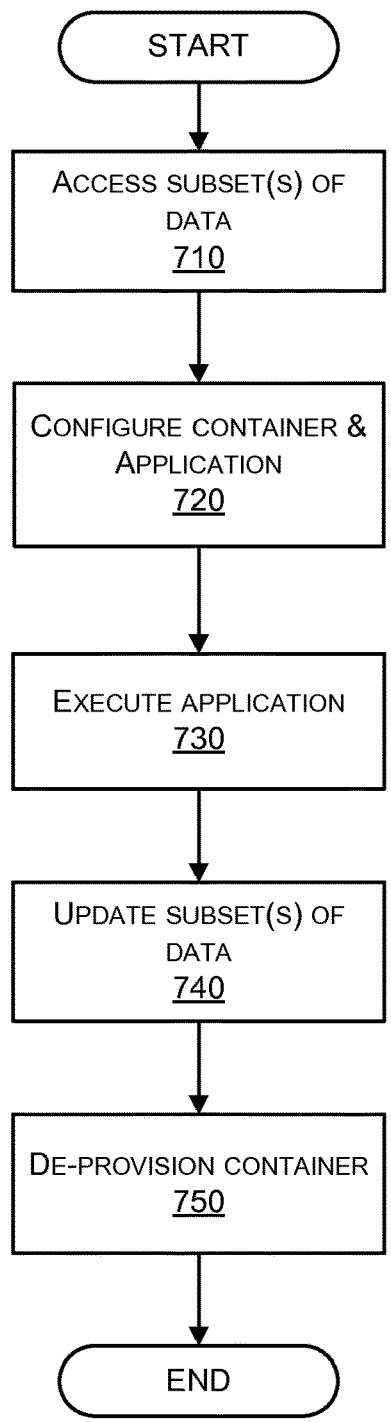
FIG. 7 is a flowchart illustrating exemplary instructions included within a workflow, according to one or more embodiments.

FIG. 7 illustrates exemplary instructions included within a workflow. A workflow represents one or more sets of instructions that are transmitted to a compute node for implementation therein. As shown, a workflow includes a set of instructions, illustrated as 710-750. In some embodiments, a workflow transmitted to a compute node may include additional instructions to those illustrated in FIG. 7.

As shown, a first instruction within a workflow, illustrated as instruction 710, indicates that subsets of application data are to be accessed. Each subset of data may be stored in one or more storage elements. In addition, one or more storage elements may use storage organizational types that are different from a storage organization type used by an application. Thus, the implementation of instruction 710 at a compute node may involve connecting and mounting a storage element (or a copy thereof) to a compute node, determining the storage organizational type of each storage element, performing any necessary data abstractions to ensure that each subset of data is compatible within an application, and configuring data share environments for subsets of data (if needed) to enable such data to be shared with other compute nodes.

At 720, a second instruction is included in a workflow, which indicates that containers and/or applications should be configured at a compute node. The use of containers is optional. If containers are to be used, a compute node is instructed to configure containers and applications at this point. Alternatively, if containers are not to be used, only applications are to be configured by the compute node as part of 720. Thereafter, another instruction is included in a workflow, at 730, to indicate that a compute node should execute application(s) (e.g., using the corresponding application data accessed at 710).

At 740, another instruction is included in a workflow for instructing a compute node to update one or more subsets of application data (e.g., to reflect the results of the execution of the application). The execution of such an instruction may include modifying a previous version of application data and/or replacing the previous version of application data with a new version of application data. In addition, the updating of application data may involve performing additional data abstractions to return the updated application data to the organizational type that is used by the storage element and/or removing previously configured data share environments.

A final instruction may be included in a workflow, as shown in 750, for instructing a compute node to de-provision a container, if such containers were used for the execution of the application. De-provisioning a container refers to a process by which the particular configuration of a container is removed. At this point, the process of FIG. 7 ends.

Figure 8:
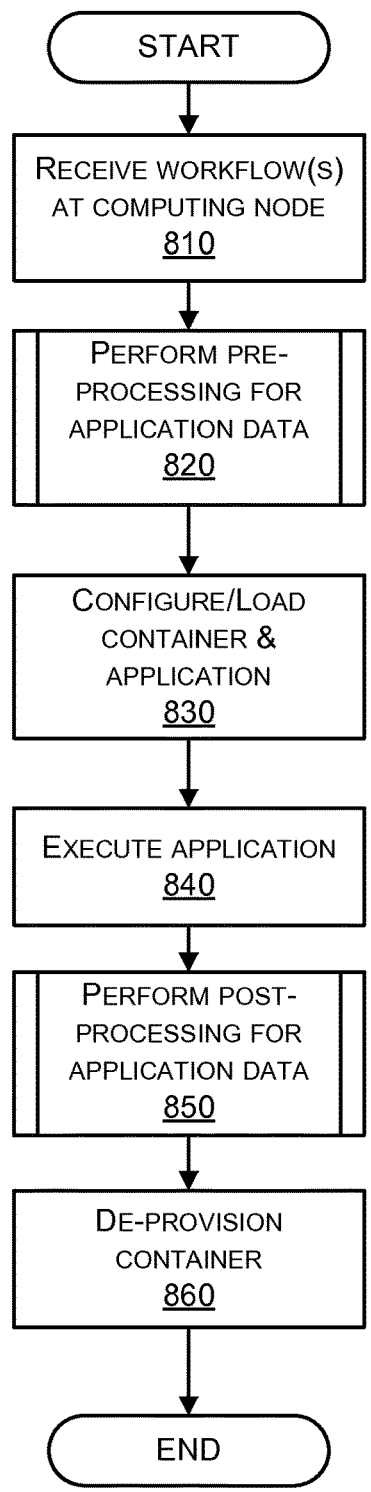
FIG. 8 is a flowchart illustrating an overall method for processing a workflow, according to one or more embodiments.

FIG. 8 illustrates a process for executing a workflow, as performed by a compute node. The process begins at 810, where the compute node receives one or more workflows (from a server). At 820, pre-processing for application data is performed. Application data may be accessed from one or more storage elements. In order to access application data from each storage element, a compute node and/or each storage element should pre-process application data to allow such application data to be retrieved and used by an application to be executed at the compute node. Details regarding the pre-processing of application data are shown with reference to FIGS. 9, 10A, and 10B.

After the application data has been pre-processed, the process continues to 830. At 830, a container (if being used) and a corresponding application are configured and/or loaded on the compute node. In some cases, a template for a container, application, or both may have already been created and saved. If such templates exist, the necessary templates are retrieved and loaded at the compute node. Once both the container and application are loaded, the process continues to 840, where the application is executed. The application, when executing, may retrieve and modify application data (e.g., to obtain results). Thus, when the application is done executing, the process continues to 850. At 850, post-processing of application data is performed to update the application data to an updated state. Details regarding the post-processing of application data are shown with reference to FIGS. 11, 12A, and 12B.

At 860, the compute node de-provisions the container, if used. At this point, the process of FIG. 8 ends. The process of FIG. 8 is repeatable by a compute node. In addition, the process of FIG. 8 is performed by each compute node that is involved in performing a single job. Thus, if a job requires multiple compute nodes, a corresponding workflow is sent to each respective compute node, and each compute node can execute such a workflow using the process of FIG. 8.

Figure 9:
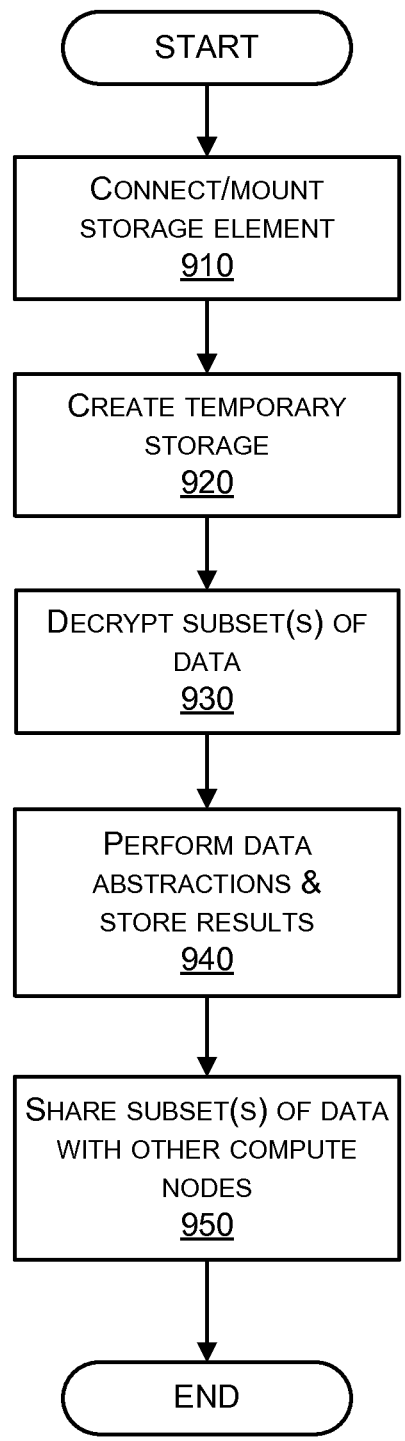
FIG. 9 is a flowchart illustrating a method for executing a portion of a workflow directed to pre-processing application data, according to one or more embodiments.

FIG. 9 illustrates a method for executing a portion of a workflow directed to pre-processing application data. The process of FIG. 9 is performed by a compute node, in combination with a storage element. The process begins at 910, where a connection is made from the storage element to a compute node. Each compute node identified in a job can connect to the same storage element, if the storage element is mountable and supports multiple connection paths. By contrast, if the storage element is mountable but does not support multiple connection paths, or if the storage element is not mountable, only one connection is made from the storage element to a compute node (e.g., the master compute node). The remaining compute nodes (referred to as slave compute nodes) are not connected to the storage element. Thus, the operations performed at 910 will vary depending on the number of compute nodes involved in a job (and whether each compute node is serving as a master compute node or slave compute node) and the connection/mounting capabilities of the storage element to be used.

In some embodiments, a connection may be made from a compute node to a first storage element, where the first storage element is further coupled to additional storage elements. These additional storage elements may or may not be of the same organizational type and may or may not require data abstractions to enable data to be retrieved by, and shared with, the first storage element.

Once a connection has been established, an attempt is made to mount the storage element on the compute node(s) as part of 910. Some storage elements may be of a mountable type. If a storage element is mountable (e.g., able to be accessed like a file system), the storage element can be and will be mounted on the respective compute node(s). Once mounted, application data can be accessed directly from the storage element (after being decrypted, if the application data is encrypted in the storage element), and thus, any and all changes made to the application data can be reflected in the storage element in real-time.

By contrast, if a storage element is not mountable (e.g., not able to be accessed like a file system), the process continues to 920. At 920, temporary storage is created, typically within the compute node. Application data in the storage element is thereafter copied to temporary storage. This temporary storage can then be mounted on the compute node for use therein as a file system (once the necessary data abstractions have been performed on such data).

In some cases, a storage element may be of a mountable type, but treated as a non-mountable type for performance reasons. As an example, a compute node and/or the storage element itself can perform analysis and comparisons to determine the speed at which application data can be accessed from the storage element versus temporary storage. If a determination is made that application data can be accessed at a faster rate from temporary storage, and such a configuration is possible, the application data in the storage element is copied to temporary storage, even though the storage element can be directly mounted on the compute node. Likewise, a similar analysis can also be performed to determine whether a storage element has the necessary performance requirements needed for the retrieval and use of application data therein. If such performance requirements cannot be met, data within the storage element can be copied to temporary storage instead.

The process then continues to 930, where subset(s) of data are decrypted, if needed. Data within a storage element may be encrypted. In order for such data to be used by an application, the application data must be decrypted beforehand. Decryption of application data can be performed in one of two different ways. One approach is to decrypt all data in a storage element before the application is executed. Another approach is to decrypt data "on the fly" which results in data being decrypted, as needed, during the execution of an application. Decryption as a whole may be performed for non-mountable storage elements that are copied to temporary storage. The decryption processes are performed on the copy of data in temporary storage. In some embodiments, however, encryption "on the fly" may be performed for object-level application data that is stored and mounted on temporary storage.

Decryption "on the fly" can be performed during the execution of applications, as certain portions of application data are needed or called upon. In such cases, decryption information (e.g., such as an encryption key and/or algorithm information) is retrieved and used to perform the necessary decryptions. Decryption "on the fly" protects all other data in a storage element from being accessed. In some embodiments, however, storage elements of a mountable type, although able to perform decryption "on the fly," may opt to perform decryption as a whole for the storage element for performance reasons.

At 940, data abstractions are performed, as needed. Data abstractions are processes that are performed by a compute node to ensure data from a storage element is in a form that is usable by an application. For example, data that is organized into objects or blocks may not be usable by an application that relies upon file-level data to perform operations. Thus, data that is organized into blocks or objects will need to be manipulated in some way to transform such data into files (or at least be able to be called upon as files).

As an example, block information can be modified or re-mapped to represent file information. Similarly, object information can be analyzed and converted into file information. Similar approaches can be performed for other data represented in other storage organizational types that are different from the organizational type that is used by an application. Any conversion information resulting from the above data abstractions can be saved and stored as part of 940.

At 950, application data is configured to be shared with other compute nodes, if needed. Data that is only available to a compute node via a single connection path or as part of objects stored in a non-mountable storage element may need to be shared with other compute nodes, as part of a job. In both of these scenarios, the application data is only mounted or copied to one compute node, referred to as the master compute node. In 950, the mounted application data is exported to all other compute nodes, referred to as slave compute nodes, via a management or Infiniband network. By exporting such data, slave compute nodes are able to view and access application data that is mounted on the master compute node. Policies may be defined and used to ensure data integrity is maintained. At this point, the process of FIG. 9 ends.

Figure 10A:
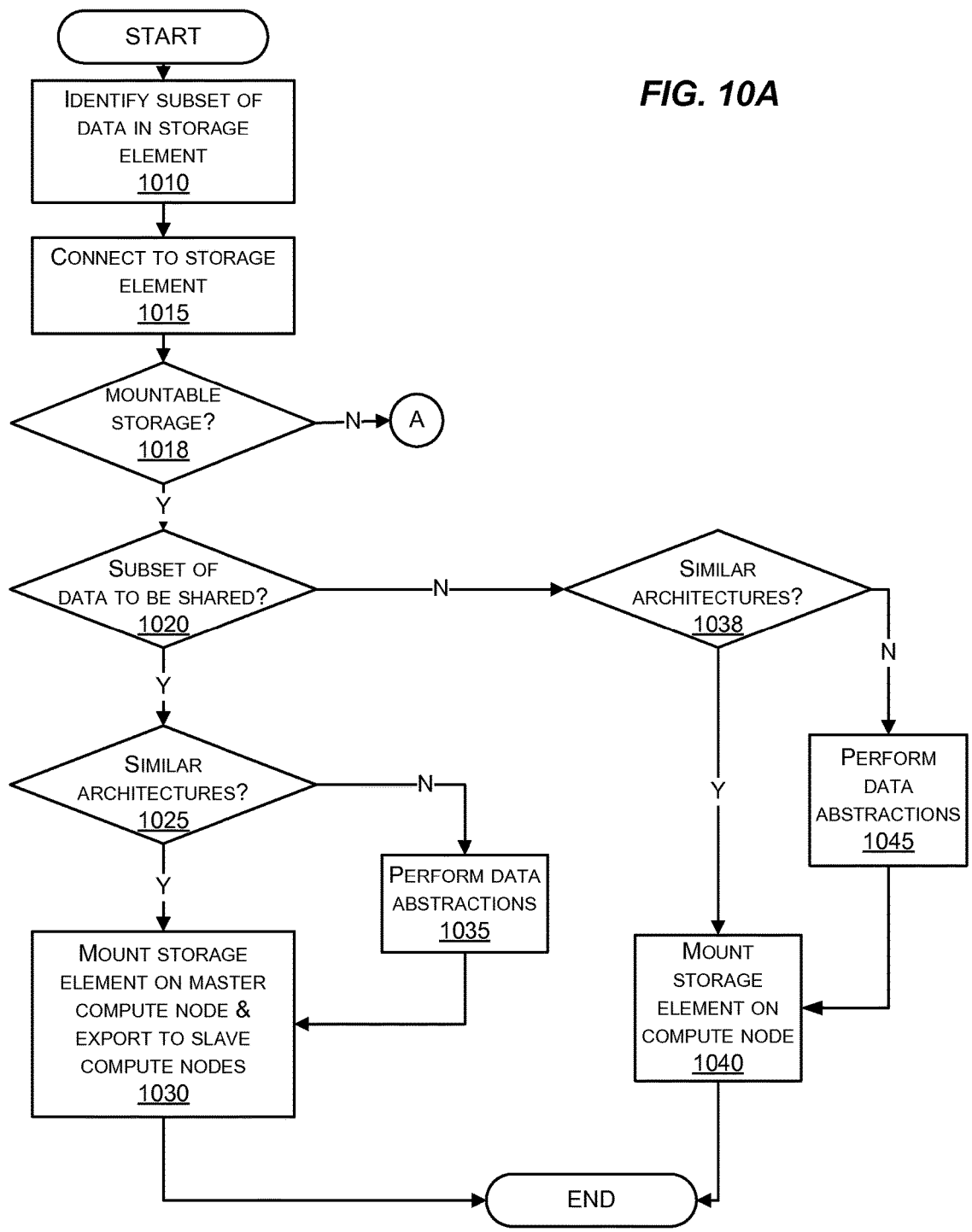
FIG. 10A is a flowchart illustrating a method for executing a portion of a workflow directed to pre-processing application data, according to one or more embodiments.

FIG. 10A illustrates a method for executing a portion of a workflow directed to pre-processing application data. The method of FIG. 10A is performed by a compute node. The process begins at 1010, where a subset of data in a storage element is identified. The process continues to 1015, where a connection is made from the storage element to the compute node(s).

At 1018, a determination is made as to whether the storage element is of a mountable-type. If the storage element is mountable, the process continues to 1020. At 1020, another determination is as to whether the subset of data is to be shared with other compute nodes. If a determination is made that the subset of data is to be shared, the process continues to 1025. At 1025, yet another determination is made as to whether the storage architecture of the storage element and the application are the same.

If a determination is made that the storage architectures are similar, the process continues to 1030. At 1030, the storage element is mounted on the master compute node and the data within the storage element is exported to the remaining slave compute nodes. Referring back to 1025, if a determination is made that the storage architectures are not the same, the process continues to 1035. At 1035, the compute node performs the necessary data abstractions on the application data, prior to performing the mounting and exporting of 1030.

Referring back to 1020, if a determination is made that the subset of data is not to be shared, then the process continues to 1038. At 1038, a determination is made as to whether the storage architecture of the storage element and application are similar. If a determination is made at 1038 that the storage architectures are the same, the process continues to 1040. At 1040, the storage element is mounted on the compute node. Alternatively, if a determination is made at 1038 that the architectures are not the same, the process continues to 1045. At 1045, the necessary data abstractions are performed before the storage element is mounted on the compute node at 1040.

Figure 10B:
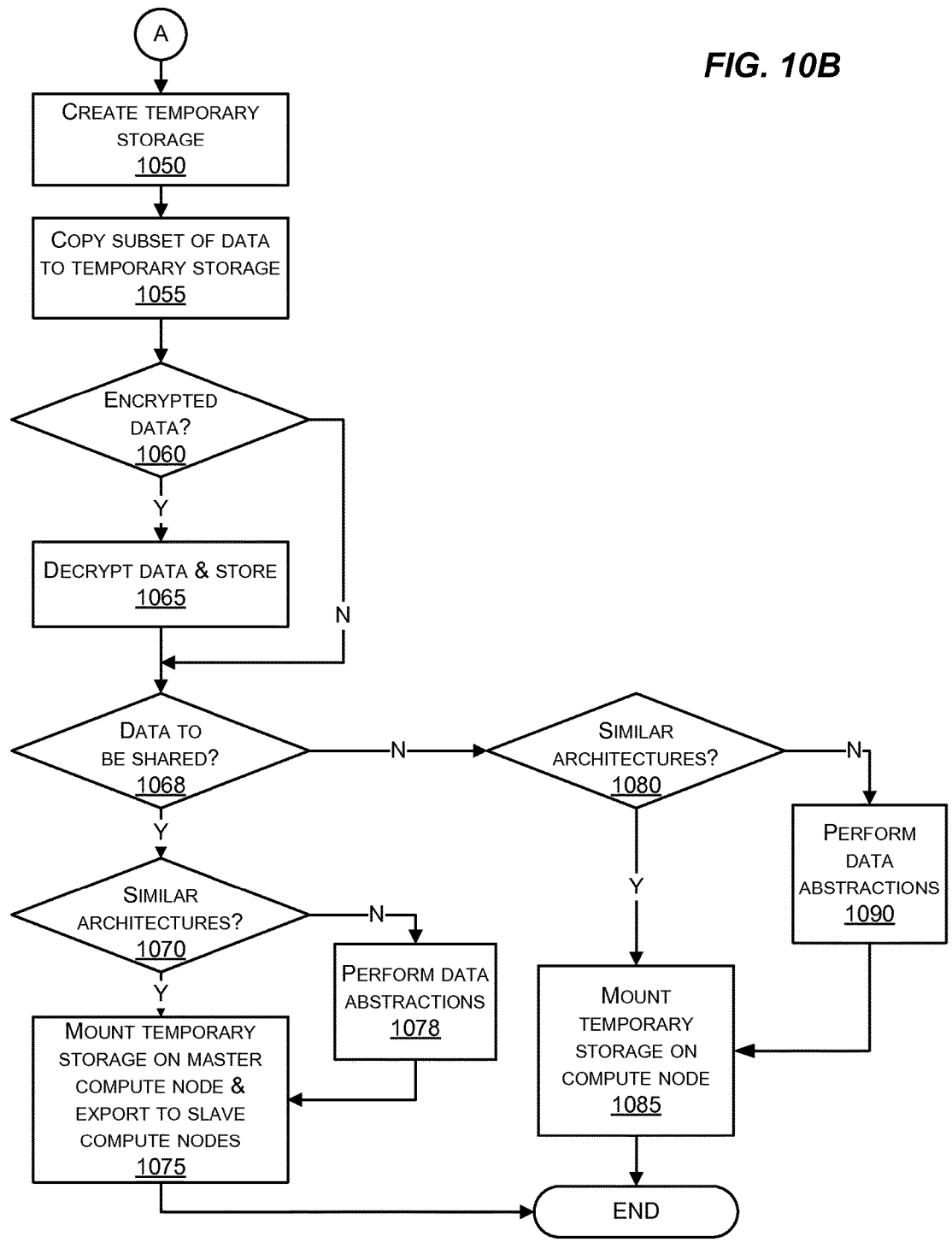
FIG. 10B is a flowchart illustrating additional details regarding the method for executing the portion of the workflow directed to pre-processing application data, according to one or more embodiments.

Referring back to 1018, if a determination is made that the storage element is not mountable, the process continues to 1050 of FIG. 10B. At 1050, temporary storage is created. At 1055, the subset of data from the storage element is copied to temporary storage. At 1060, a further determination is made as to whether the subset of data is encrypted. If a determination is made that the data is encrypted, the process continues to 1065. At 1065, the subset of data is decrypted and stored in temporary storage. The process then continues to 1068. By contrast, if a determination is made that the data is not encrypted, the process continues to 1068.

At 1068, a determination is made as to whether the data is to be shared with other compute nodes during a job. If a determination is made that the data is to be shared, the process continues to 1070. At 1070, a determination is made as to whether the storage architecture of the storage element and the application are the same. If a determination is made that the storage architectures are similar, the process continues to 1075. At 1075, the temporary storage is mounted on the master compute node and exported to the slave compute nodes.

Alternatively, if a determination is made at 1070 that the storage architectures are not the same, the process continues to 1078, where data abstractions are performed by the compute node to transform such data into a storage organizational type that is usable by the application. The process then continues to 1075 to mount the temporary storage on the master compute node and export the temporary storage to the slave compute nodes. At this point, the process ends.

Referring back to 1068, if a determination is made that the data is not to be shared, the process continues to 1080. At 1080, a determination is made as to whether the storage architecture of the storage element and the application are the same. If a determination is made that the storage architectures are the same, the process continues to 1085, where the temporary storage is mounted on the compute node. Alternatively, if the storage architectures are not the same, the necessary data abstractions are performed at 1090, prior to mounting the temporary storage on the compute node at 1085. At this point, the process ends.

Figure 11:
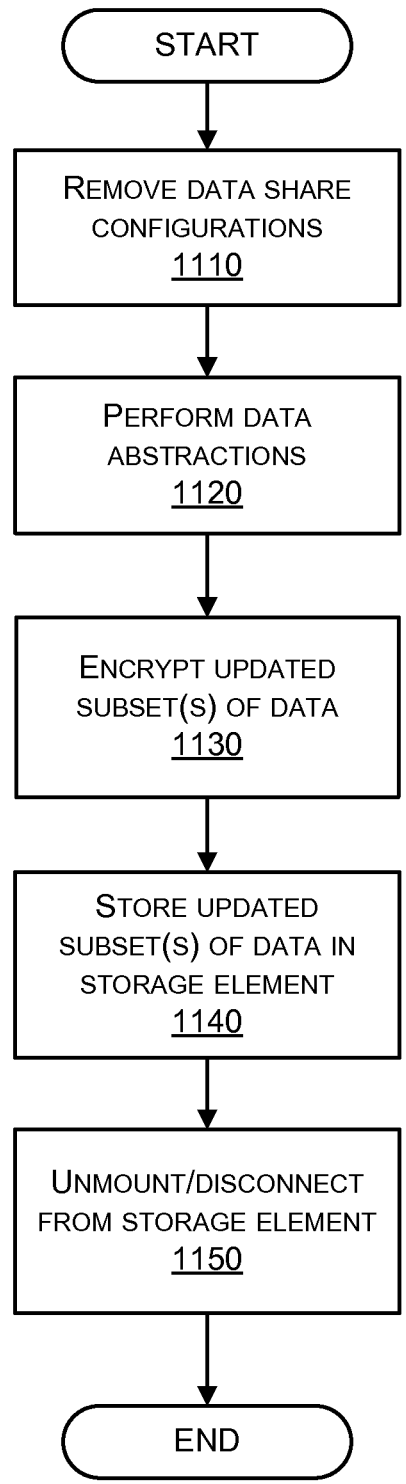
FIG. 11 is a flowchart illustrating a method for executing a portion of a workflow directed to post-processing application data, according to one or more embodiments.

FIG. 11 illustrates a method for executing a portion of a workflow directed to post-processing application data. The process of FIG. 11 is performed by a compute node, in combination with a storage element. The process begins at 1110, where any data share configurations that have been previously set up are removed. A data share configuration is typically accomplished by mounting application data from a storage element (or a copy thereof) on a master compute node and exported to slave compute nodes. At 1110, the export of the application data to the slave compute nodes is removed. This involves removing any connections that allow the slave compute nodes to access the application data from the master compute node. Thus, after performing 1110, the master compute node should be the only compute node able to access the application data from the storage element.

The process continues to 1120, where data abstractions are performed on the application data. Application data may have been abstracted in some manner to transform the application data from an original form (e.g., an original storage organizational type) to another form (e.g., a second organizational type) in order to be usable or compatible with an application. If such data abstractions were performed, the reverse data abstractions may be performed at 1120 to return the updated application data to the original form or original storage organizational type (e.g., that is usable or compatible with the storage element).

At 1130, the updated application data is encrypted, if needed, prior to being returned to the storage element. If a storage element stores data in an encrypted form, then updated application data should be encrypted, prior to being stored back in the storage element. Similarly, if an entire subset of application data is decrypted prior to being used, then an updated subset of application data should be encrypted, as a whole, prior to being stored back in the storage element. The functionality of 1130 is optional and may only be performed when encryption is used by a storage element. If a storage element does not encrypt the data stored therein, the functionality of 1130 is not performed.

The process continues to 1140. At 1140, an updated subset of application data is stored in the storage element. At this point, any updated subset of data has already been abstracted (as needed) and encrypted (if needed), and thus is ready to be returned to a storage element. In cases where a subset of data had to be copied and mounted in temporary storage, the contents of temporary storage are copied back to the storage element for storage therein. Such updated information can be stored along with the original subset of data or can replace the original subset of data. If the storage element was mounted on a compute node, any updates to the subset of data are already reflected within the storage element (since such data was used and updated in real-time). Thus, no additional storing or updating may be needed for mountable storage elements.

In some embodiments, a workflow may indicate that the results of the execution of the application are to be returned to a storage element that is different from the storage element from which the subset of data was originally accessed. For example, a subset of data may be accessed from a first storage element and then returned in an updated form (e.g., representing the results of the execution of an application) to a second storage element. In even further embodiments, the first and second storage elements may be of different storage architecture types. For example, a subset of data may be retrieved from a first storage element that organizes data into files, while the results of the execution of the application are to be stored in a second storage element that organizes data into objects in cloud storage. In such scenarios, additional data abstractions may be performed to modify the updated subset of data to be in a form that is compatible with the second storage element. Such functionality would be performed automatically by a compute node as part of 1140.

At 1150, the storage element or temporary storage is unmounted from the compute node. In cases of mountable storage elements, the storage element is unmounted and disconnected from the compute node. By contrast, if the storage element is not of a mountable type, the temporary storage is unmounted from the compute node, and the connection from the storage element to the compute node is removed. At this point, the process then ends.

Figure 12A:
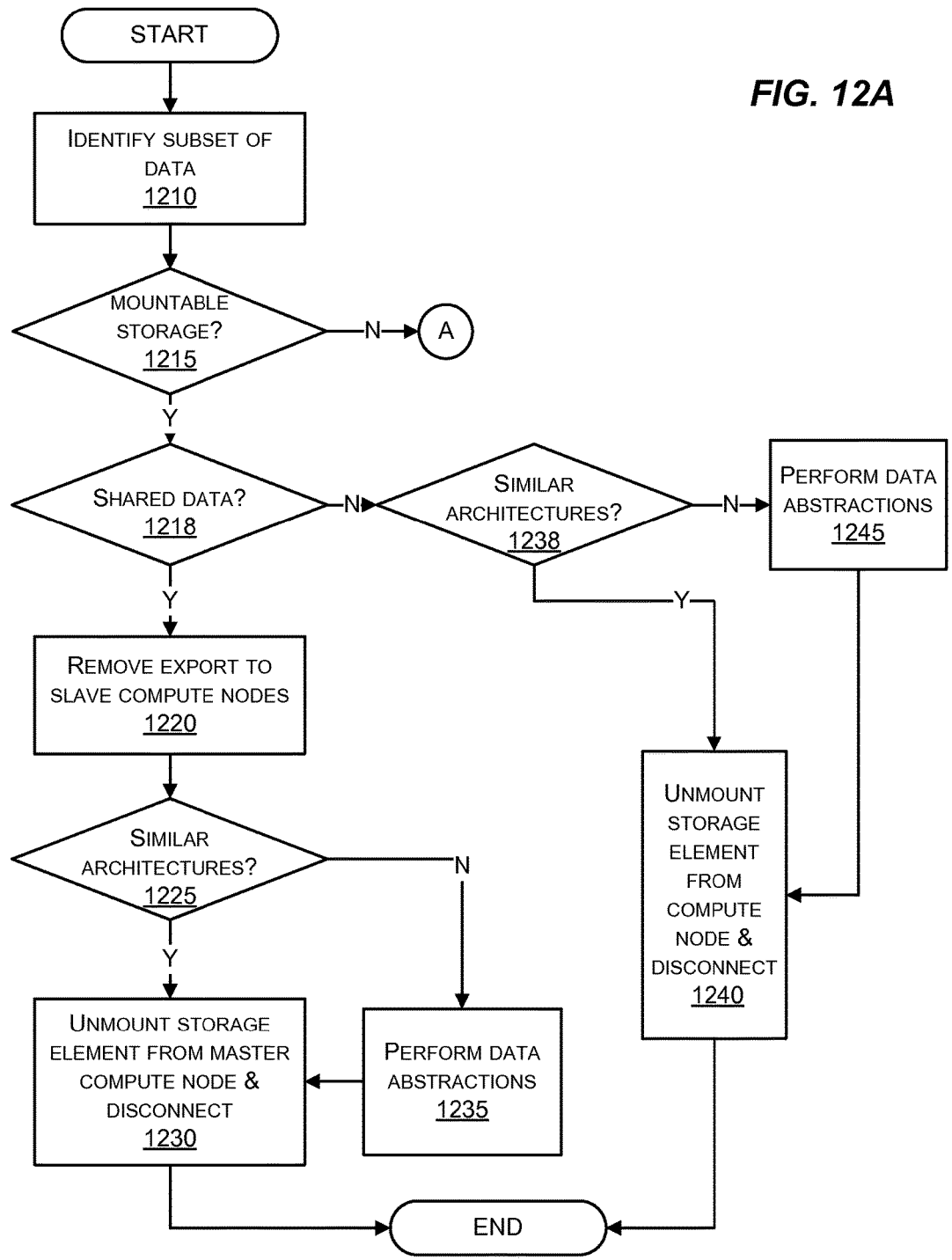
FIG. 12A is a flowchart illustrating a method for executing a portion of a workflow directed to post-processing application data, according to one or more embodiments.

FIG. 12A illustrates a method for executing a portion of a workflow directed to post-processing application data. The process of FIG. 12A can be performed by a compute node, alone or in combination with a storage element. The process begins at 1210 where a subset of data is identified. At 1215, a determination is made as to whether the storage element is of a mountable type. If the storage element is of a mountable type, the process continues to 1218. At 1218, a determination is made as to whether a data share configuration has been previously set up between compute nodes.

If a data share configuration has been previously set up, the process continues to 1220. At 1220, the export of data to slave compute nodes is removed. The process then continues to 1225. At 1225, a determination is made as to whether the storage element and the application utilize similar storage architectures. If a determination is made that the storage architectures are similar, the process continues to 1230. At 1230, the storage element is unmounted from the master compute node. In addition, the connection existing between the storage element and the master compute node is removed. Alternatively, if at 1225 a determination is made that the storage architectures are not similar, the process continues to 1235, where the necessary data abstractions are performed, prior to continuing to 1230 to unmount and disconnect the storage element from the master compute node.

Referring back to 1218, if a determination is made that no data share configuration has been previously set up, the process continues to 1238. At 1238, a determination is made as to whether the storage architectures of the storage element and the application are similar. If the storage architectures are similar, the process continues to 1240. At 1240, the storage element is unmounted from the compute node. In addition, the connection existing between the storage element and the compute node is removed. Alternatively, if the storage architectures are not similar, data abstractions are performed first at 1245, before continuing to 1240 to unmount and disconnect the storage element from the compute node.

Figure 12B:
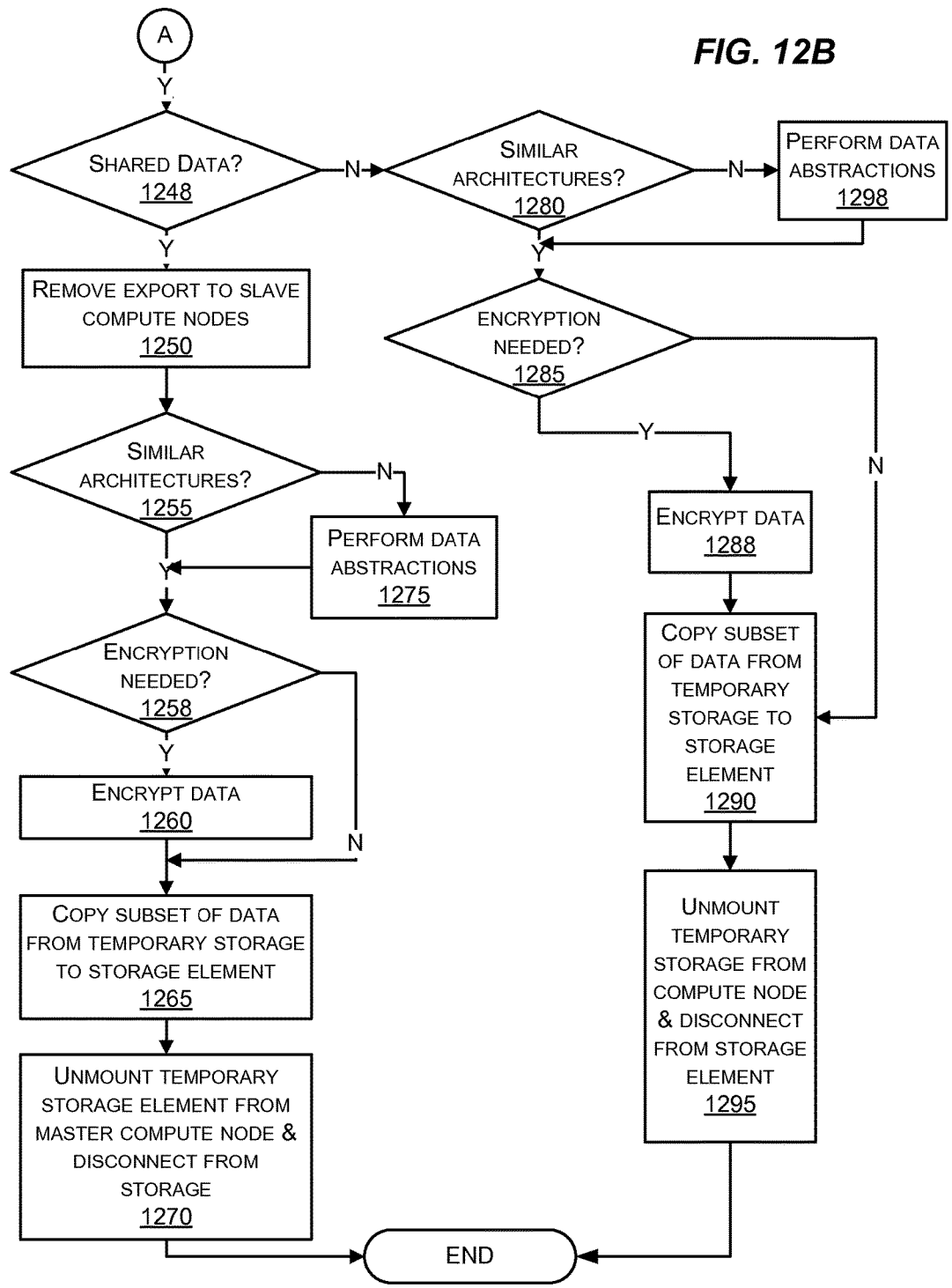
FIG. 12B is a flowchart illustrating additional details regarding the method for executing the portion of the workflow directed to post-processing application data, according to one or more embodiments.

Referring back to 1215, if a determination is made that the storage element is not of a mountable type, the process continues to 1248 of FIG. 12B. At 1248, a determination is made as to whether a data share configuration has been previously set up for the application data. If a data share configuration has been previously set up, the process continues 1250. At 1250, the export of application data to the slave compute nodes is removed. The process then continues to 1255, where a determination is made as to whether the storage element and the application have similar storage architectures. If a determination is made that the storage architectures are similar, the process continues to 1258. Alternatively, if the storage architectures are not similar, the process performs the necessary data abstractions at 1275 before continuing to 1258.

At 1258, a determination is made as to whether encryption is needed for the application data. Encryption may be needed if the storage element encrypts data stored therein. If a determination is made at 1258 that encryption is needed, the process continues to 1260 where the application data is encrypted. The process then continues to 1265. Alternatively, if no encryption is needed, the process continues to 1265.

At 1265, the updated subset of data is copied from temporary storage to the storage element. Thereafter, at 1270, the temporary storage is unmounted from the master compute node. In addition, the existing connection from the master compute node and the storage element is removed.

Referring back to 1248, if a determination is made that a data share configuration has not been previously set up, the process continues to 1280. At 1280, a determination is made as to whether the storage architectures of the storage element and the compute node are similar. If a determination is made that the storage architectures are similar, the process continues to 1285. Alternatively, if a determination is made that the storage architectures are not similar, the process continues to 1298 to perform data abstractions, as needed, before continuing to 1285.

At 1285, a determination is made as whether encryption is needed for the updated application data. If encryption is needed, the process continues to 1288 to encrypt such data. The process then continues to 1290. Alternatively, if encryption is not needed, the process continues to 1290.

At 1290, the subset of data is copied from temporary storage to the storage element. The process then continues to 1295, where the temporary storage is unmounted from the compute node. In addition, the connection existing between the compute node and the storage element is removed. At this point, the process of FIG. 12B ends.

Elements of network architecture can be implemented using different computer systems and networks. An example of one such network environment is described below with reference to FIG. 13.

Figure 13:
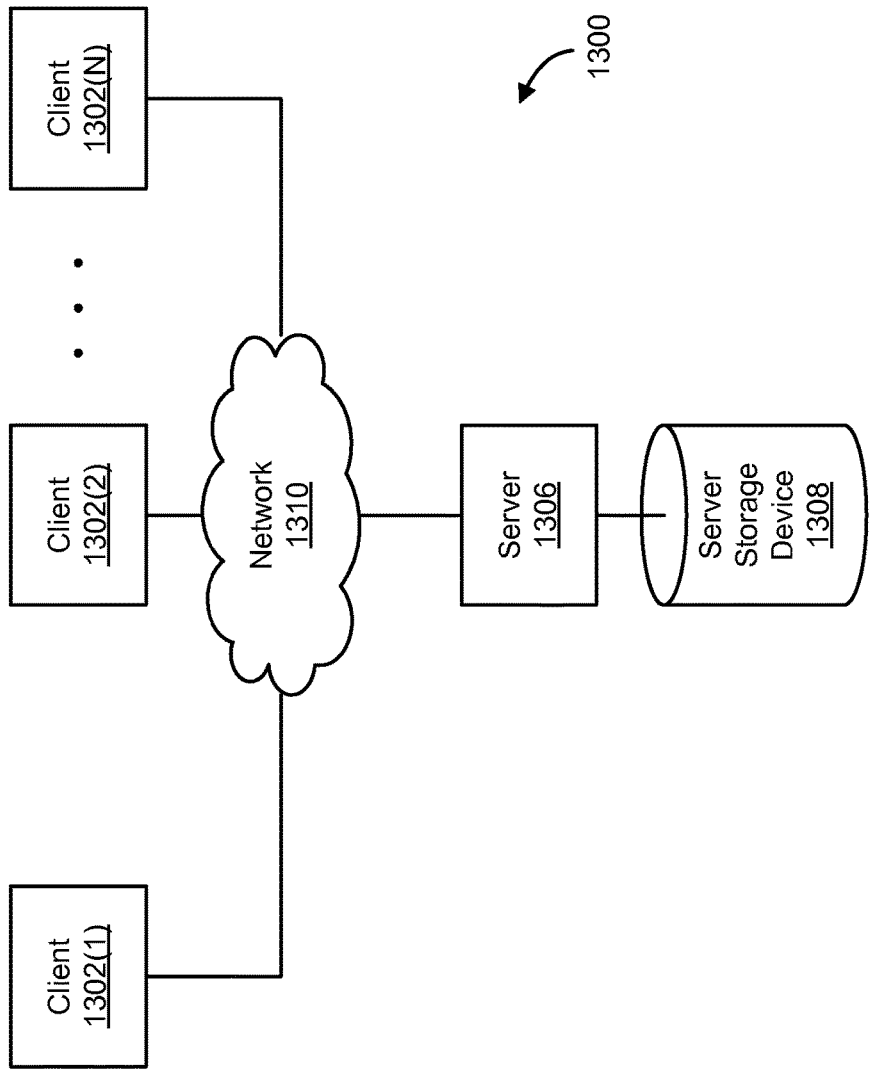
FIG. 13 is a block diagram illustrating a network architecture in which an embodiment of the present invention can be implemented.

FIG. 13 is a simplified block diagram illustrating a network architecture 1300 in which one or more clients are provided with access to a server via various network connections. As depicted in FIG. 13, clients 1302(1)-(N) are coupled to a network 1310 (which can be used to implement network 106A and/or 106B), and so are able to access a server 1306 (which can be used to implement server 104 and/or node(s) 112(1)-112(N)) via network 1310. Other servers (not shown) can be used instead to implement server 104). A client can be implemented using, for example, a desktop computer, a laptop computer, a workstation, a server, a cell phone, a smart phone, a network-enabled personal digital assistant (PDA), or the like. An example of network 1310, which can be used by clients 1302(1)-(N) to access server 1306, is the Internet. Alternatively, access to server 1306 can be provided by a local area network (LAN) utilizing Ethernet, IEEE 802.11x, or some other communications protocol. As will be appreciated, server 1306 can be accessed by clients coupled directly thereto (not shown).

As also depicted on FIG. 13, server 1306 is coupled to a server storage device 1308, which includes a data volume such as cluster shared volume. Server storage device 1308 can be implemented as a single storage device or a collection of storage devices. Server storage device 1308 can also be implemented as a storage area network, which couples remote storage devices to a server (e.g., server 1306), such that the remote storage devices appear as locally-attached storage devices to the server's OS, for example.

In light of the present disclosure, those of skill in the art will appreciate that server storage device 1308 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1300 can include other components such as routers, firewalls and the like that are not germane to the discussion of the present network and will not be discussed further herein. Those of skill in the art will also appreciate that other configurations are possible. For example, clients 1302(1)-(N) can be directly coupled to server storage device 1308 without the user of a server or Internet; server 1306 can be used to implement both the clients and the server; network architecture 1300 can be implemented without the use of clients 1302(1)-(N), and so on.

As an example implementation of network architecture 1300, server 1306 (implemented with a server 104) services requests to data generated by clients 1302(1)-(N) to data stored in server storage device 1308 (implemented with third-party storage 110). Other servers (not depicted) can be implemented with server 104. A server module (e.g., server module 114) can be implemented using one of the other servers in the manner illustrated by FIG. 2.

Figure 14:
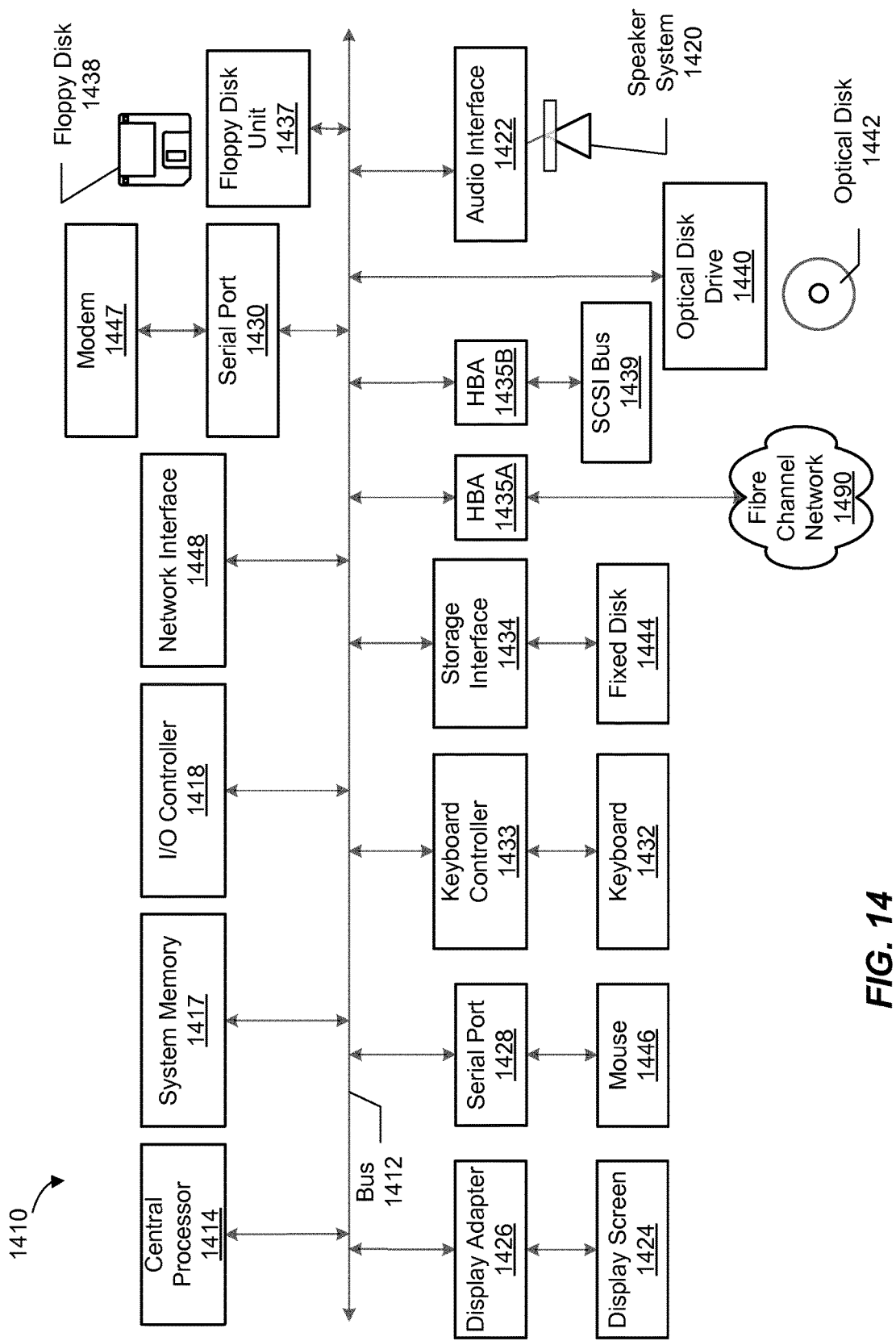
FIG. 14 is a block diagram illustrating an example computer system suitable for implementing embodiments of the present invention.

FIG. 14 depicts a block diagram of a computer system 1410 suitable for implementing the present disclosure. Computer system 1410 may be illustrative of various computer systems in distributed computing system 100, such as server(s) 104 or nodes 112(1)-112(N), among others. Computer system 1410 includes a bus 1412 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk drive 1437 operative to receive a floppy disk 1438, a host bus adapter (HBA) interface card 1435A operative to connect with a Fibre Channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412).

Bus 1412 allows data communication between central processor 1414 and system memory 1417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., fixed disk 1444), an optical drive (e.g., optical disk drive 1440), a floppy disk unit 1437, or other storage medium. Additionally, applications can be in the form of electronic signals modulated in accordance with the application and data communication technology when accessed via network modem 1447 or interface 1448.

Storage interface 1434, as with the other storage interfaces of computer system 1410, can connect to a standard computer readable medium for storage and/or retrieval of information, such as a fixed disk drive 1444. Fixed disk drive 1444 may be a part of computer system 1410 or may be separate and accessed through other interface systems. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 14 need not be present to practice the present disclosure. The devices and subsystems can be interconnected in different ways from that shown in FIG. 14. The operation of a computer system such as that shown in FIG. 14 is readily known in the art and is not discussed in detail in this application. Code for server module 114, agent(s) used by node(s) 112(1)-112(N) and/or for providing use of a distributed computing system (such as described above with reference to methods described by FIGS. 6-12B), etc., to implement the present disclosure can be stored in computer-readable storage media such as one or more of system memory 1417, fixed disk 1444, optical disk 1442, or floppy disk 1438. Memory 1420 is also used for storing temporary variables or other intermediate information during the execution of instructions by the processor 1410. The operating system provided on computer system 1410 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments (including the Appendix), the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, implemented in a computer system, comprising:
   identifying, by a processor of the computer system, data to be used by an application to be executed by one or more compute nodes of a plurality of compute nodes, wherein
      the computer system is configured to be coupled to the plurality of compute nodes,
      the data comprises a first subset of data,
      the first subset of data is stored in a first storage element of a remote computer system,
      the first subset of data is stored in a first form,
      the remote computer system is remote from the computer system by virtue of the computer system being further configured to be coupled to the remote computer system by a network, and
      the plurality of compute nodes does not comprise the remote computer system;
   generating, by the processor, a workflow at the computer system, wherein
      the workflow is configured to configure each of the one or more compute nodes to communicate with the remote computer system via the network, and
      the workflow is configured to cause the one or more compute nodes to
         determine whether the first form is compatible with the application,
         in response to a determination that the first form is compatible with the application,
            mount the first subset of data on at least one of the plurality of compute nodes, such that the first subset of data is accessible by the application via the network, without retrieval of the first subset of data from the first storage element, and
            update the first subset of data by executing the application on the first subset of data, and
         in response to a determination that the first form is not compatible with the application,
            retrieve the first subset of data from the first storage element, via the network,
            store the first subset of data in temporary storage at one or more of the compute nodes, as a stored first subset of data,
            process the stored first subset of data to generate a processed first subset of data, wherein
               the processed first subset of data is generated by converting the stored first subset of data from the first form into a second form, and
               the second form is compatible with the application,
            produce a result by executing the application, using the processed first subset of data, and
            update the first subset of data, using the result; and
   transmitting the workflow to the one or more compute nodes, wherein
      the transmitting causes the one or more compute nodes to execute the application using at least a corresponding portion of the processed first subset of data.

2. The method of claim 1, further comprising:
   identifying a second subset of data, wherein
      the first subset of data is stored using a first storage architecture,
      the first storage architecture organizes the first subset of data in the first form,
      the data comprises the second subset of data,
      the second subset of data is stored in a second storage element,
      the second subset of data is stored using a second storage architecture, and
      the second storage architecture organizes data in a third form that is not compatible with the first form the workflow is further configured to cause a compute node of the one or more compute nodes to retrieve the second subset of data,
process the second subset of data into the second form, and
update the second subset of data stored in the second storage element.

3. The method of claim 2, wherein
the first subset of data is processed by
performing a first abstraction of the first subset of data to be in the second form that is compatible with the application; and
the first subset of data is updated by
performing a second abstraction for an updated version of the first subset of data to be in the first form.

4. The method of claim 3, wherein
the first subset of data is processed by
sharing the first subset of data with a second compute node, wherein
the workflow indicates that the first subset of data is to be shared with the second compute node, and
the sharing is performed by
mounting the first storage element or the temporary storage on the compute node, and
exporting the first subset of data to the second compute node; and
the first subset of data is updated by
removing the export of the first subset of data to the second compute node, and
unmounting the first storage element or the temporary storage from the compute node.

5. The method of claim 3, wherein
the first subset of data is processed by
decrypting at least a portion of data in the first subset of data; and
the first subset of data is updated by
encrypting an updated version of the at least the portion of the data in the first subset of data.

6. The method of claim 1, wherein the first subset of data is retrieved from the first storage element by
accessing the first subset of data, wherein
the first subset of data is unmounted prior to determining whether the first form is compatible with the application, and
the first subset of data remains unmounted, in response to the determination that the first form is not compatible with the application.

7. The method of claim 1, wherein
the workflow identifies the application,
the workflow indicates that the application is to be executed within a container, and
the workflow indicates that the first subset of data is to be updated after the application has completed execution.

8. The method of claim 1, further comprising at least one of:
unmounting from the first storage element; or
copying an updated version of the processed first subset of data from the temporary storage to the first storage element.

9. The method of claim 1, further comprising:
performing an abstraction of a second subset of data to be compatible with the first storage element, wherein
the first subset of data is stored using a first storage architecture,
the first storage architecture organizes the first subset of data in a first form that is not compatible with the application,
the data comprises the second subset of data,
the second subset of data is stored in a second storage element,
the second storage element is coupled to the first storage element, and
the first subset of data and the second subset of data are stored using similar storage architectures.

10. The method of claim 1, further comprising:
copying the first subset of data in the first storage element to the temporary storage, even if the first storage element can be mounted on a compute node of the one or more compute nodes.

11. The method of claim 1, wherein the first subset of data is updated by:
storing an updated version of the first subset of data in a second storage element.

12. The method of claim 1, wherein
the first form is a storage architecture of file-level storage, object-level storage, or block-level storage.

13. The method of claim 12, wherein
the second form is another storage architecture of the file-level storage, the object-level storage, or the block-level storage that is other than the storage architecture.

14. A system comprising:
a server, comprising
one or more processors, and
a server module, wherein
the server module is configured to
identify data to be used by an application to be executed by one or more compute nodes of a plurality of compute nodes, wherein
the server is configured to be coupled to the plurality of compute nodes,
the data comprises a first subset of data,
the first subset of data is stored in a first storage element of a remote computer system,
the first subset of data is stored in a first form,
the remote computer system is remote from the server by virtue of the server being further configured to be coupled to the remote computer system by a network, and
the plurality of compute nodes does not comprise the remote computer system,
generate a workflow at the server, wherein
the workflow is configured to configure each of the one or more compute nodes to communicate with the remote computer system via the network, and
the workflow is configured to cause the one or more compute nodes to
determine whether the first form is compatible with the application,
in response to a determination that the first form is compatible with the application,
mount the first subset of data on at least one of the plurality of compute nodes, such that the first subset of data is accessible by the application via the network, without retrieval of the first subset of data from the first storage element, and
update the first subset of data by executing the application on the first subset of data, and
in response to a determination that the first form is not compatible with the application,
retrieve the first subset of data from the first storage element, via the network, store the first subset of data in temporary storage at one or more of the compute nodes, as a stored first subset of data,
process the stored first subset of data to generate a processed first subset of data, wherein
the processed first subset of data is generated by converting the stored first subset of data from the first form into a second form, and
the second form is compatible with the application,
produce a result by executing the application, using the processed first subset of data, and
update the first subset of data, using the result, and
transmit the workflow to the one or more compute nodes, wherein
the workflow is configured to cause the one or more compute nodes to execute the application using at least a corresponding portion of the processed first subset of data.

15. The system of claim 14, further comprising:
a compute node of the one or more compute nodes, wherein
the compute node is configured to retrieve the first subset of data by performing at least one of
upon the first subset of data being mounted on the compute node, accessing the first subset of data from via the network, or
upon the stored first subset of data being processed, accessing the processed first subset of data.

16. The system of claim 14, further comprising:
a compute node of the one or more compute nodes, wherein
the compute node is configured to process the first subset of data by performing a first abstraction of the first subset of data to be in a second form that is compatible with the application, and
the compute node is configured to update the first subset of data by performing a second abstraction for an updated version of the first subset of data to be in a first form.

17. The system of claim 16, wherein
the compute node is further configured to process the first subset of data by sharing the first subset of data with a second compute node, wherein
the workflow indicates that the first subset of data is to be shared with the second compute node, and
the sharing is performed by
mounting the first storage element or the temporary storage on the compute node, and
exporting the first subset of data to the second compute node, and
the compute node is further configured to update the first subset of data by
removing the export of the first subset of data to the second compute node, and
unmounting the first storage element or the temporary storage from the compute node.

18. The system of claim 16, wherein
the compute node is further configured to process the first subset of data by decrypting at least a portion of data in the first subset of data, and
the compute node is further configured to update the first subset of data by encrypting an updated version of the at least the portion of the data in the first subset of data.

19. The system of claim 14, wherein
the workflow identifies the application,
the workflow indicates that the application is to be executed within a container, and
the workflow indicates that the first subset of data is to be updated after the application has completed execution.

20. A computer program product comprising:
a plurality of instructions, comprising
a first set of instructions, executable on a computer system, configured to identify data to be used by an application to be executed by one or more compute nodes of a plurality of compute nodes, wherein
the computer system is configured to be coupled to the plurality of compute nodes,
the data comprises a first subset of data,
the first subset of data is stored in a first storage element of a remote computer system,
the first subset of data is stored in a first form,
the remote computer system is remote from the computer system by virtue of the computer system being further configured to be coupled to the remote computer system by a network, and
the plurality of compute nodes does not comprise the remote computer system,
a second set of instructions, executable on the computer system,
configured to generate a workflow at the computer system, wherein
the workflow is configured to configure each of the one or more compute nodes to communicate with the remote computer system via the network, and
the workflow is configured to cause a compute node to
determine whether the first form is compatible with the application,
in response to a determination that the first form is compatible with the application,
mount the first subset of data on at least one of the plurality of compute nodes, such that the first subset of data is accessible by the application via the network, without retrieval of the first subset of data from the first storage element, and
update the first subset of data by executing the application on the first subset of data, and
in response to a determination that the first form is not compatible with the application,
retrieve the first subset of data from the first storage element, via the network,
store the first subset of data in temporary storage at one or more of the compute nodes, as a stored first subset of data,
process the stored first subset of data to generate a processed first subset of data, wherein
the processed first subset of data is generated by converting the stored first subset of data from the first form into a second form, and
the second form is compatible with the application,
produce a result by executing the application, using the processed first subset of data, and
update the first subset of data stored in the first storage element, using the result; and
a third set of instructions, executable on the computer system, configured to transmit the workflow to the one or more compute nodes, wherein the workflow is configured to cause the one or more compute nodes to execute the application using at least a corresponding portion of the processed first subset of data; and
a non-transitory computer-readable storage medium, wherein the plurality of instructions are encoded in the non-transitory computer-readable storage medium.

21. The computer program product of claim 20, wherein the second set of instructions is further configured to
    upon the first subset of data being mounted on a compute node of the one or more compute nodes, access the first subset of data from the first storage element that is mounted on the compute node, or
    upon the stored first subset of data being processed, access the processed first subset of data,
    perform a first abstraction of the first subset of data to be in a second form that is compatible with the application, and
    perform a second abstraction for an updated version of the first subset of data to be in a first form.

22. The computer program product of claim 21, wherein the second set of instructions is further configured to
    cause the first subset of data to be shared with a second compute node, wherein
        the workflow indicates that the first subset of data is to be shared with the second compute node, and
        the first subset of data is shared by
            mounting the first storage element or the temporary storage on the compute node, and
            exporting the first subset of data to the second compute node,
    removing the export of the first subset of data to the second compute node, and
    unmounting the first storage element or the temporary storage from the compute node, wherein
        the workflow indicates that the application is to be executed within a container.

* * * * *